United States Patent
Joo et al.

(10) Patent No.: US 9,617,660 B2
(45) Date of Patent: Apr. 11, 2017

(54) REINFORCING NANOFIBER ADDITIVES

(71) Applicant: CORNELL UNIVERSITY, Ithaca, NY (US)

(72) Inventors: Yong Lak Joo, Ithaca, NY (US); Nathaniel S. Hansen, Portland, OR (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/428,435

(22) PCT Filed: Sep. 16, 2013

(86) PCT No.: PCT/US2013/059894
§ 371 (c)(1),
(2) Date: Mar. 16, 2015

(87) PCT Pub. No.: WO2014/043605
PCT Pub. Date: Mar. 20, 2014

(65) Prior Publication Data
US 2015/0240388 A1 Aug. 27, 2015

Related U.S. Application Data

(60) Provisional application No. 61/701,889, filed on Sep. 17, 2012.

(51) Int. Cl.
| | |
|---|---|
| *C08K 5/04* | (2006.01) |
| *D01F 8/04* | (2006.01) |
| *D04H 1/4382* | (2012.01) |
| *D04H 1/728* | (2012.01) |
| *D04H 1/4209* | (2012.01) |
| *C08K 3/14* | (2006.01) |
| *C08K 3/34* | (2006.01) |
| *C09K 5/14* | (2006.01) |

(52) U.S. Cl.
CPC ............... *D01F 8/04* (2013.01); *C08K 3/14* (2013.01); *C08K 3/34* (2013.01); *C09K 5/14* (2013.01); *D04H 1/4209* (2013.01); *D04H 1/4382* (2013.01); *D04H 1/728* (2013.01)

(58) Field of Classification Search
CPC .... D01F 8/04; C09K 5/14; C08K 3/34; C08K 3/14
USPC ......................................................... 524/394
See application file for complete search history.

(56) References Cited

U.S. PATENT DOCUMENTS

| | | | |
|---|---|---|---|
| 7,151,129 B2 | 12/2006 | Ishikawa et al. | |
| 9,243,347 B2 * | 1/2016 | Joo | ....................... D01D 5/0069 |
| 2011/0052467 A1 | 3/2011 | Chase et al. | |

OTHER PUBLICATIONS

Zhang et al., Nanoscale, 2, 1670-1673, 2010.*
International Search Report and Written Opinion Form PCT/ISA/220, International Application No. PCT/US2013/059894, pp. 1-15, International Filing Date Sep. 16, 2013.
Chronakis, Ioannis S., 2005, "Novel Nanocomposites and Nanoceramics Based on Polymer Nanofibers Using Electrospinning Process—A Review", Journal of Materials Processing Technology, vol. 167, pp. 283-293.
Sigmund et al., 2006, "Processing and Structure Relationships in Electrospinning of Ceramic Fiber Systems", Journal of the American Ceramic Society, vol. 89, No. 2, pp. 395-407.
Li et al., Jun. 20,2003, "Electrospinning of Polymeric and Ceramic Nanofibers as Uniaxially Aligned Arrays", Nano Letters, vol. 3, No. 8, pp. 1167-1171.

* cited by examiner

*Primary Examiner* — Hui Chin
(74) *Attorney, Agent, or Firm* — Bond, Schoeneck & King, PLLC; William Greener; Alek Szecsy

(57) ABSTRACT

Provided herein are high performance reinforcing nanostructure additives, high throughput processes for using such additives, and composites comprising such additives. Such nanostructure additives include nanofibers, including nanofiber fragments, of various matrix materials, including metal(s) (e.g., elemental metal(s), metal alloy(s), etc.), metal oxide(s), ceramic(s), metal carbide(s), carbon (e.g., carbon nanocomposites comprising carbon matrix with metal component embedded therein), and/or combinations thereof.

17 Claims, 10 Drawing Sheets

G - CdO

H - ZrO$_2$

I – Pb

J - ZnO/ZrO$_2$

K - Ag/ZrO$_2$

L - Ni/ZrO$_2$

REINFORCING NANOFIBER ADDITIVES

CROSS-REFERENCE

This application claims the benefit of U.S. Provisional Application No. 61/701,889, filed Sep. 17, 2012, which is incorporated herein by reference in its entirety.

BACKGROUND OF THE INVENTION

Manufacturers mix additive materials with matrix materials to optimize and enhance properties, improve performance, and/or decrease costs of bulk materials.

SUMMARY OF THE INVENTION

Provided herein are reinforcing nanostructure additives, composites comprising reinforcing nanostructure additives, and processes for producing reinforcing nanostructure additives. In specific embodiments, reinforcing nanostructures comprise nanofibers, and/or fragments thereof. In some embodiments, reinforcing nanostructures provided herein comprise at least one metal component (e.g., metal, metal oxide, metal carbide, ceramic, or combinations thereof). In specific embodiments, the metal component comprises at least one metal in an oxidation state of zero or greater (e.g., 0-4). In certain embodiments, the reinforcing nanostructures comprise (a) metal nanofibers, and/or fragments thereof; (b) metal oxide nanofibers, and/or fragments thereof; (c) metal carbide nanofibers, and/or fragments thereof; or (d) ceramic nanofibers, and/or fragments thereof. In some embodiments, the metal component comprises at least two metals (e.g., a metal-metal alloy). In certain embodiments, the at least one metal component comprises at least two metal components (e.g., a nanocomposite nanostructure).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
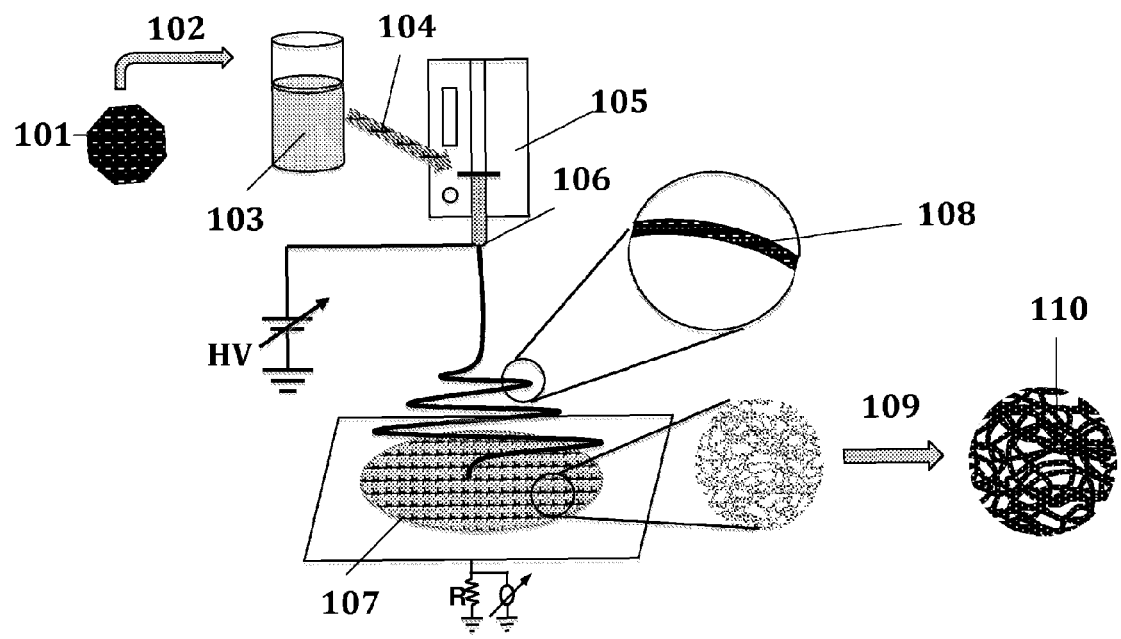
FIG. 1 illustrates a schematic of an apparatus and process for preparing nanostructures described herein.

Provided herein are nanostructure materials, composites comprising nanostructure materials, and processes for producing such nanostructure materials. In some instances, such nanostructures and compositions comprising a plurality of such nanostructures are used as or useful as additives for bulk materials. In certain instances, these nanostructures are nanofibers, or are fragments of or prepared from nanofibers, such as by fracturing nanofibers into fragments thereof. In some embodiments, addition of such additives to a bulk material serves to reinforce the bulk material. In further embodiments, reinforcement of the bulk material with such additives improves the performance of a material, reduces the costs of a material, or provides other benefits thereto. In general, the processes described herein provide the ability to prepare nanostructures with improved performance properties over other nanostructures, such as those prepared by sol gel electrospinning, low loading solution electrospinning, nanowire growth, and the like.

In some embodiments, reinforcing nanostructures provided herein comprise at least one metal component (e.g., metal, metal oxide, metal carbide, ceramic, or combinations thereof). In specific embodiments, the metal component comprises at least one metal in an oxidation state of zero or greater (e.g., 0-4). In specific embodiments, the nanofibers are high in metal content (e.g., on an elemental wt % basis).

Also, provided in certain embodiments herein is a process for producing reinforcing nanostructure additives, the process comprising (a) treating (e.g., thermally treating) an electrospun nanofiber comprising a metal reagent component (e.g., metal precursor) and a polymer; and (b) optionally fracturing the treated nanofiber (e.g., via sonication). In some embodiments, the electrospun nanofiber comprising a metal reagent component (e.g., metal precursor) and a polymer is prepared by electrospinning a fluid stock, the fluid stock comprising (1) a metal reagent component; and (2) polymer. In specific embodiments, the metal reagent component comprises a metal precursor, a metal oxide nanoparticle, a metal nanoparticle, or a combination thereof. In more specific embodiments, the metal reagent component is a metal precursor.

Nanostructure Composition/Additive

In some instances a nanostructure or plurality of nanostructures provided herein comprise, on average, at least 20% by weight of the at least one metal component. In more specific embodiments, the metal component constitutes, on average, at least 33% of the nanostructure(s). In still more specific embodiments, the metal component constitutes, on average, at least 50% of the nanostructure(s). In yet more specific embodiments, the metal and component constitutes, on average, at least 70% of the nanostructure(s). In more specific embodiments, the metal component constitutes, on average, at least 90% of the nanostructure(s). In various embodiments, the metal component constitutes, on average, at least 10%, at least 25%, at least 40%, at least 60%, at least 75%, at least 80%, at least 95%, at least 97%, at least 98%, or at least 99% of the nanostructure(s).

In some instances a nanostructure or plurality of nanostructures provided herein comprise, on average, at least 20 elemental wt. % metal. In more specific embodiments, metal constitutes, on average, at least 33 elemental wt. % of the nanostructure(s). In still more specific embodiments, metal constitutes, on average, at least 50 elemental wt. % of the nanostructure(s). In yet more specific embodiments, metal constitutes, on average, at least 70 elemental wt. % of the nanostructure(s). In more specific embodiments, metal constitutes, on average, at least 90 elemental wt. % of the nanostructure(s). In various embodiments, metal constitutes, on average, at least 10 elemental wt. %, at least 25 elemental wt. %, at least 40 elemental wt. %, at least 60 elemental wt. %, at least 75 elemental wt. %, at least 80 elemental wt. %, at least 95 elemental wt. %, at least 97 elemental wt. %, at least 98 elemental wt. %, or at least 99 elemental wt. % of the nanostructure(s).

In some embodiments, provided herein are high quality nanostructure additives and processes for preparing high quality nanostructure additives that have good structural integrity, few voids (e.g., having a region so narrow as to cause the nanostructure to be so narrow as to be brittle or have low conductivity, or having regions missing so as to have a discontinuous structure), few structural defects (e.g., amorphous regions an an otherwise crystalline nanostructure, crystalline regions in an otherwise amorphous nanostructure, or the like), tunable length, and the like. In some instances, voids or structural defects lead to decreased performance of the nanostructure additives. For example, in some instances, voids or structural defects cause the nanostructure additives to have decreased strength, fracture toughness, conductivity, or the like. In one example, voids and defects in the nanofiber include breaks in the nanofiber, regions of nanofiber wherein the diameter is so narrow as to be easily broken (e.g., having a diameter of less than 10% or less than 5% of the average nanofiber diameter), regions of the nanofiber wherein the nanofiber material has anomalous morphologies (e.g., crystalline domains in a substantially amorphous nanofiber—such crystalline domains may increase fracturing and brittleness of the nanofiber), and the like. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor). In certain embodiments, high loading of precursor, relative to polymer loading, in the fluid stock and/or precursor/electrospun nanofibers, facilitates and/or provides such high quality nanofibers.

Provided in various embodiments herein are carbonaceous nanofibers comprising high metal and carbon content (e.g., carbonaceous nanofibers comprising a carbon matrix and domains of metal or metal carbide nanofibers). In some embodiments, nanofibers provided herein comprise at least 99%, at least 98%, at least 97%, at least 96%, at least 95%, at least 90%, at least 80%, or the like of metal and carbon, when taken together, by mass (e.g., elemental mass). In some embodiments, carbonaceous nanofibers provided herein comprise at least 50%, at least 60%, at least 70%, or at least 75% metal by mass (e.g., elemental mass).

In some embodiments, nanofibers provided herein comprise less than 5% oxygen by mass. In certain embodiments, nanofibers provided herein comprise less than 3% oxygen by mass. In specific embodiments, nanofibers provided herein comprise less than 2% oxygen by mass. In more specific embodiments, nanofibers provided herein comprise less than 2% oxygen by mass. In still more specific embodiments, nanofibers provided herein comprise less than 0.5% oxygen by mass.

Provided in certain embodiments herein are nanostructures comprising high metal, oxygen and optionally carbon content (e.g., carbonaceous nanofibers comprising a carbon matrix and domains of metal oxide). In some embodiments, nanostructures provided herein comprise at least 99%, at least 98%, at least 97%, at least 96%, at least 95%, at least 90%, at least 80%, or the like of metal, oxygen and carbon, when taken together, by mass (e.g., elemental mass). In more specific embodiments, nanostructures provided herein comprise at least 99%, at least 98%, at least 97%, at least 96%, at least 95%, at least 90%, at least 80%, or the like of metal and oxygen, when taken together, by mass (e.g., elemental mass). In some embodiments, carbonaceous nanofibers provided herein comprise at least 20%, at least 30%, at least 40%, or at least 50% metal by mass (e.g., elemental mass). In some embodiments, nanostructures provided herein comprise at least 50%, at least 60%, at least 70%, or at least 75% metal oxide by mass (e.g., elemental mass).

In some embodiments, nanostructures provided herein comprise a continuous matrix of a metal component described herein (e.g., metal, metal oxide, ceramic, metal carbide, or the like). In some specific embodiments, the continuous matrix is a continuous crystalline matrix. In other specific embodiments, the continuous matrix is a continuous amorphous matrix. In some embodiments, a continuous matrix of a nanostructure described herein is continuous along a substantial portion of the nanostructure (e.g., along the length—longest dimension—of the nanostructure). In some embodiments, the continuous matrix is found along at least 50%, at least 60%, at least 70%, at least 80%, at least 90%, at least 95%, at least 98%, or at least 99% the length of the nanostructure (e.g., on average for a plurality of nanostructures). In some instances, the continuous matrix runs along at least 50% the length of the nanostructure (e.g., on average for populations of nanofibers). In specific instances, the continuous matrix runs along at least 70% the length (e.g., on average) of the nanostructure(s). In more specific instances, the continuous matrix runs along at least 80% the length (e.g., on average) of the nanostructure (s). In still more specific embodiments, the continuous matrix runs along at least 90% of the length (e.g., on average) of the nanostructure (s). In yet more specific embodiments, the continuous matrix runs along at least 95% of the length (e.g., on average) of the nanostructure (s).

FIG. 13 illustrates the XRD data for exemplary nanostructures provided herein. Panels A, C, D, E, and I illustrate XRD data for crystalline nanofibers of metal nanostructures. Panels B, F, G, and H illustrate XRD data for crystalline nanofibers of metal oxide nanostructures. Panels O, P, Q, and R illustrate XRD data for exemplary crystalline metal alloy nanostructures. Panels J, K, L, M, and N (with no peaks for amorphous alumina) illustrate XRD data for exemplary nanocomposite nanostructures.

Metal Component

Provided herein are nanostructures and processes of preparing such nanostructures, wherein the nanostructures comprise at least one metal component. In some embodiments, the at least one metal component comprises a single metal component. In other embodiments, the at least one metal component(s) comprise two or more metal components (e.g., a composite material). In addition, in some embodiments, each metal component independently comprises one or more metal type (e.g., an example of a metal component comprising two or more metal types is a metal-metal alloy) (a "metal type" may be a specific metal in a zero oxidation state and/or an oxidation state greater than zero). Thus, in some instances, provided herein are metal components comprising a single metal type, but in further or other embodiments, provided herein are metal components comprising two or more metal type. In some instances, a nanostructure comprises at least two metal components, e.g., one of which comprises a single metal type, and a second comprises two or more metal types.

In certain embodiments, a nanostructure provided herein comprises at least one metal component. In various embodiments, the at least one metal component comprises metal material comprising a single metal with an oxidation state of zero (e.g., Fe, Ti, Al, Cu, Co, Ni, Si, etc.), or a single metal with an oxidation state of greater than zero (e.g., a metal oxide, such as titania or zirconia; a metal carbide, such as iron carbide, silicon carbide, titanium carbide; or the like). In other embodiments, the at least one metal component comprises metal material comprising at least two metals with an oxidation state of zero (e.g., Fe, Ti, Al, Cu, Co, Ni, Si, etc.), or at least two metals with an oxidation state of greater than zero (e.g., khamrabaevite—(Ti,V,Fe)C). In some instances, such metal components comprising at least two metals are alloys. Exemplary metal components comprising two or more components (e.g., two or more metals) include, by way of non-limiting example, CdSe, CdTe, PbSe, PbTe, FeNi (perm alloy), Fe—Pt intermetallic compound, stainless steel, Pt—Pb, Pt—Pd, Pt—Bi, Pd—Cu, and Pd—Hf. In other embodiments, the at least one metal component comprises metal material comprising at least one metal with an oxidation state of zero (e.g., Fe, Ti, Al, Cu, Co, Ni, etc.), and at least one metal with an oxidation state of greater than zero.

In some embodiments, the metal component is or comprises at least one metalloid component. In various embodiments, the at least one metal component comprises metalloid material comprising a single metal with an oxidation state of zero (e.g. Si), or a single metalloid with an oxidation state of greater than zero (e.g., $SiO_2$, SiC). In other embodiments, the at least one metal component comprises metal material comprising at least two metalloids with an oxidation state of zero, or at least two metalloids with an oxidation state of greater than zero.

In some embodiments, a nanostructure comprises at least one metal component. In yet other embodiments, the at least one metal component comprises metal material comprising at least one metal with an oxidation state of zero (e.g., Fe, Ti, Al, Cu, Co, Ni, etc.), and at least one metal with an oxidation state of greater than zero (e.g., a metal oxide, a metal carbide, or the like).

In various embodiments, a metal component (or metal reagent component) provided herien comprises any suitable metal (e.g., in a zero or greater than zero oxidation state), including a transition metal, alkali metal, alkaline earth metal, post-transition metal, lanthanide, or actinide. In certain embodiments, the metal is a transition metal. In some embodiments, the metal is a period IV transition metal. In certain embodiments, the metal is a period V transition metal. In some embodiments, the metal is a group XIII metal. In certain embodiments, the metal is a group XIV metal. In various embodiments, transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Jr), platinum (Pt), gold (Au), mercury (Hg), rutherfordium (Rf), dubnium (Db), seaborgium (Sg), bohrium (Bh), and hasium (Hs). Suitable alkali metals include: lithium (Li), sodium (Na), potassium (K), rubidium (Rb), cesium (Cs) and francium (Fr). Suitable alkaline earth metals include: beryllium (Be), magnesium (Mg), calcium (Ca), strontium (Sr), barium (Ba), and radium (Ra). Suitable post-transition metals include: aluminum (Al), gallium (Ga), indium (In), tin (Sn), thallium (Tl), lead (Pb), and bismuth (Bi). Suitable lanthanides include the elements with atomic number 57 to 71 on the periodic table. Suitable actinides include the elements with atomic number 89 to 103 on the periodic table. In some embodiments, the metal is a metalloid, such as, germanium (Ge), antimony (Sb) and polonium (Po), or silicon (Si). It is to be understood that metal components described herein are intended to include metalloid components. In some embodiments, the metal component is not an oxide of silicon (e.g., $SiO_2$ or $SiTiO_3$). In other embodiments, the metal component is not an oxide of titanium (e.g., $TiO_2$ or $SiTiO_4$). In yet other embodiments, the metal component is not a ceramic.

Such metals are optionally present in the metal component(s) of the nanostructure in an oxidation state of zero (generally referred to herein as a "elemental metal" or "elemental metalloid"), greater than zero, or a combination thereof. Oxidations states of greater than zero include metal oxides, metal carbides, and the like. In specific embodiments, the metal component of a nanostructure provided herein comprises a metal oxide. In more specific embodiments, the metal oxide is a ceramic, such as alumina, silica, titania, zirconia, or the like. Exemplary metal components comprising a metal oxide include, by way of non-limiting example, $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, $Ba_{0.55}Sr_{0.45}TiO_3$, and the like.

In certain embodiments, at least one of the metal components is a material of formula (I):

$$M_xL_y \qquad (I)$$

wherein M is one or more metal and L is one or more of B, C, N, O, P, S, and/or Se, x is an integer of greater than 0, y is an integer, and z is 2-4.

In some embodiments, nanostructures described herein comprise at least one of the metal component of formula (Ia):

$$M^1{}_aM^2{}_bM^3{}_cM^4{}_dL^1{}_gL^2{}_h \qquad (Ia)$$

In specific embodiments, each of $M^1$, $M^2$, $M^3$, and $M^4$ is independently selected from a metal. In some embodiments, each of $L^1$ and $L^2$ is independently selected from B, C, N, O, P, S, or Se. In some embodiments, each of a, b, c, and d are independently selected from 0-25, the sum of a, b, c, and d is an integer greater than 0, each of g and h is independently selected from 0-10, an sum of g and h is an integer 0-20. In specific embodiments, g and h are 0. In some embodiments, $L^1$ is O and h is 0. In some embodiments, $L^1$ is B, C, or S, and h is 0. In specific embodiments, each of $M^1$, $M^2$, $M^3$, and $M^4$ are independently selected from Fe, Ti, Si, Ag, Cu, Ni, Co, Au, Al, Zr, Li, Mg, Ca, Hf, Mn, Ru, Rh, Zn, Cd, Sn, Ge. In more specific embodiments, each of $M^1$, $M^2$, $M^3$, and M⁴ are independently selected from Fe, Ti, Ag, Cu, Ni, Co, Au, Zr, Li, Mg, Ca, Hf, Mn, Ru, Rh, Zn, Cd, Sn, Ge.

Nanocomposite

Figure 9:
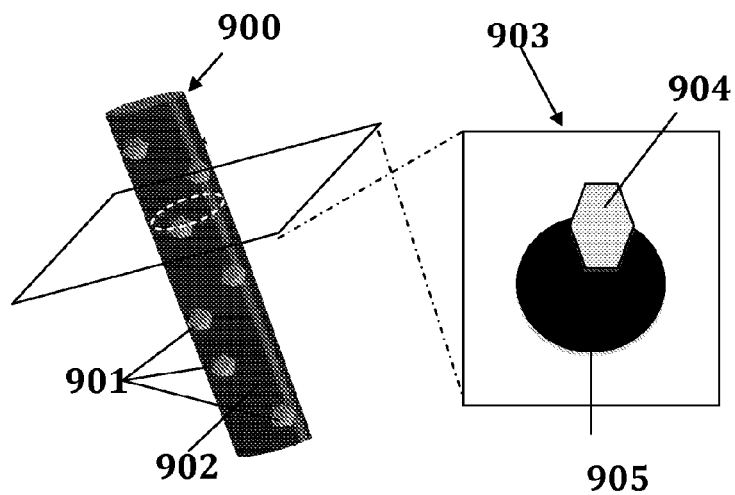
FIG. 9 illustrates an exemplary nanostructure nanocomposite.

In some embodiments, the nanostructure provided herein is a nanocomposite nanostructure. As described herein, a nanocomposite nanostructure is a material comprising at least two different components, at least one of which is a metal component as described herein. In some embodiments, the second component is a second metal component. Such nanocomposite nanostructures may also be described as composite nanostructures or hybrid nanostructures. FIG. 9 illustrates an exemplary nanostructure nanocomposite 900 comprising (i) discrete domains of metal component 901, and (ii) a continuous matrix material 902 (which may comprise a second metal component or another material, such as amorphous carbon). As illustrated in the cross-sectional view 903, the discrete domains of metal component 904 may penetrate into the core 905 of the nanostructure. In some instances, the nanostructures comprise metal component on the surface of the nanostructure. And in some instances, the nanostructures comprise or further comprise discrete domains of metal component completely embedded within the core matrix material.

In some embodiments, hybrid nanostructures comprise (i) a continuous matrix material comprising a first component, and (ii) a plurality of isolated domains comprising a second component. In some embodiments, the continuous matrix is crystalline or amorphous. In certain embodiments, the isolated domains comprise nanoparticles (e.g., comprising a metal component). In specific embodiments, the first (continuous matrix) component is any metal component described herein. In others, it is not. In some embodiments, the first (continuous matrix) component is carbon (e.g., amorphous carbon). In specific embodiments, the second component is any metal component described herein. In certain embodiments, a continuous matrix comprises a single material (and, in some instances, a similar morphology) along a significant portion of the nanostructure. For example a continuous matrix within a nanostructure is continuous along at least 50% of the length of the nanostructure (i.e., the longest dimentions of the nanostructure). In more specific embodiments, the continuous matrix runs along at least 70% of the length of the nanostructure. In still more specific embodiments, the continuous matrix runs along at least 80% of the length of the nanostructure. In yet more specific embodiments, the continuous matrix runs along at least 90% of the length of the nanostructure. In specific embodiments, the continuous matrix runs along at least 95% of the length of the nanostructure. In more specific embodiments, the continuous matrix runs along at least 98% of the length of the nanostructure. In yet more specific embodiments, the continuous matrix runs along at least 99% of the length of the nanostructure.

In certain embodiments, hybrid nanostructures comprise (i) a core comprising a first material; and (ii) a sheath comprising a second material, wherein the sheath material is layered upon and/or at least partially coats or covers the core material. Additional layers are layered on top of the sheath. Each optional layer may comprise further components, or components similar to those found in the core and/or sheath. In some instances, the hybrid nanostructure comprises a core and at least two layers (one of which is the sheath), wherein the core and two layers all comprise different materials. In other embodiments, the hybrid nanostructure comprises a core and at least two layers, wherein the core and outer layer are the same material.

In some embodiments, such hybrid nanostructures are prepared by electrospinning a first fluid stock and a second fluid stock (and optional additional fluid stock(s)) about a common axis (i.e., co-axial electrospinning). For additional disclosure on common axial electrospinning, see U.S. patent application Ser. No. 13/451,960, which is hereby incorporated herein by reference in its entirety, and, specifically, for such disclosure. In some embodiments, the first layer (core) comprises an elemental or alloy metal. In some embodiments the second layer (sheath) comprises an elemental or alloy metal. In various embodiments, the hybrid nanofiber is elemental or alloy metal-on-elemental metal, ceramic-on-elemental or alloy metal, ceramic-on-ceramic, or an elemental or alloy metal-on-ceramic. In some embodiments, the hybrid nanofiber has at least 3 components.

Additional Components

In certain embodiments, any nanostructure described herein optionally further comprises one or more additional component (i.e., in addition to the at least one metal component). For example, a nanostructure described herein may optionally comprise a continuous carbon matrix. In some embodiments, other materials may be present, such as organic materials, organic components, reactive compounds, additive, or the like.

In certain embodiments, a nanostructure or plurality of nanostructures provided herein comprises, on average, less than 20 wt. % organic material. In specific embodiments, a nanostructure provided herein comprises, on average, less than 10 wt. % organic material. In more specific embodiments, a nanostructure provided herein comprises, on average, less than 5 wt. % organic material. In still more specific embodiments, a nanostructure provided herein comprises, on average, less than 2 wt. % organic material. In yet more specific embodiments, a nanostructure provided herein comprises, on average, less than 1 wt. % organic material. In some embodiments, a nanostructure provided herein comprises, on average, less than 50 wt. % organic material, less than 30 wt. % organic material, less than 15 wt. % organic material, less than 3 wt. % organic material, less than 0.5 wt. % organic material, less than 0.1 wt. % organic material.

In certain embodiments, a nanostructure or plurality of nanostructure(s) provided herein comprises on average less than 20 elemental wt. % carbon. In specific embodiments, a nanostructure provided herein comprises, on average, less than 10 elemental wt. % carbon. In more specific embodiments, a nanostructure provided herein comprises, on average, less than 5 elemental wt. % carbon. In still more specific embodiments, a nanostructure provided herein comprises, on average, less than 2 elemental wt. % carbon. In yet more specific embodiments, a nanostructure provided herein comprises, on average, less than 1 elemental wt. % carbon. In some embodiments, a nanostructure provided herein comprises, on average, less than 50 elemental wt. % carbon, less than 30 elemental wt. % carbon, less than 15 elemental wt. % carbon, less than 3 elemental wt. % carbon, less than 0.5 elemental wt. % carbon, less than 0.1 elemental wt. % carbon.

Nanostructures

In certain embodiments, nanostructures provided herein comprise nanofibers, nanofiber fragments, or a combination thereof. In some aspects, described herein are nanostructures, nanofibers (or fragments thereof), or composite materials comprising the same having novel or improved properties. In various embodiments, these nanostructures or nanofibers (or fragments thereof) have certain dimensions, aspect ratios, specific surface areas, porosities, conductivities, flexibilities, and the like that are beyond what was previously achievable.

In some embodiments, provided herein are the nanostructures or nanofibers (or fragments thereof) having an (e.g., mean or median) aspect ratio of more than 20. In specific embodiments, nanostructures or nanofibers (or fragments thereof) provided herein an (e.g., mean or median) aspect ratio of more than 40. In more specific embodiments, nanostructures or nanofibers (or fragments thereof) provided herein an (e.g., mean or median) aspect ratio of more than 50. In still more specific embodiments, nanostructures or nanofibers (or fragments thereof) provided herein an (e.g., mean or median) aspect ratio of more than 100. In yet more specific embodiments, nanostructures or nanofibers (or fragments thereof) provided herein an (e.g., mean or median) aspect ratio of more than 200. In more specific embodiments, nanostructures or nanofibers (or fragments thereof) provided herein an (e.g., mean or median) aspect ratio of more than 400. In more specific embodiments, nanostructures or nanofibers (or fragments thereof) provided herein an (e.g., mean or median) aspect ratio of more than 500. In yet more specific embodiments, nanostructures or nanofibers (or fragments thereof) provided herein an (e.g., mean or median) aspect ratio of more than 1000. The nanostructure have any suitable aspect ratio (length/diameter). In some embodiments, the nanostructures have (e.g., mean or median) an aspect ratio of about 10, about $10^2$, or about $10^3$, about $10^4$, about $10^5$, about $10^6$, about $10^7$, about $10^8$, about $10^9$, about $10^{10}$, about $10^{11}$, about $10^{12}$, and the like. In some embodiments the nanostructures have an aspect ratio (e.g., mean or median) of at least 10, at least $10^2$, or at least $10^3$. In specific embodiments, the nanostructure have an aspect ratio (e.g., mean or median) of at least $10^4$, at least $10^5$, at least $10^6$, at least $10^7$, at least $10^8$, at least $10^9$, at least $10^{10}$, at least $10^{11}$, at least $10^{12}$, and the like. In some embodiments, the nanostructure is of substantially infinite length and has an aspect ratio of substantially infinity.

Nanostructures provided herein may have any suitable diameter (e.g., as determined by SEM, TEM, or any other suitable method) (e.g., the most narrow, or most narrow non-defect, dimension of the nanostructure). In some embodiments, nanostructures provided herein have (e.g., on average) a diameter of about 20 nm, about 30 nm, about 40 nm, about 50 nm, about 60 nm, about 70 nm, about 80 nm, about 90 nm, about 100 nm, about 130 nm, about 150 nm, about 200 nm, about 250 nm, about 300 nm, about 400 nm, about 500 nm, about 600 nm, about 700 nm, about 800 nm, about 900 nm, about 1,000 nm, about 1,500 nm, about 2,000 nm and the like. In some embodiments, nanostructures provided herein have (e.g., on average) a diameter of at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 250 nm, at most 300 nm, at most 400 nm, at most 500 nm, at most 600 nm, at most 700 nm, at most 800 nm, at most 900 nm, at most 1,000 nm, at most 1,500 nm, at most 2,000 nm and the like. In certain embodiments, nanostructures provided herein have (e.g., on average) a diameter of between about 50 nm and about 300 nm, between about 50 nm and about 150 nm, between about 100 nm and about 400 nm, between about 100 nm and about 200 nm, between about 500 nm and about 800 nm, between about 60 nm and about 900 nm, and the like. In specific embodiments, nanostructures provided herein have (e.g., on average) a diameter of less than 500 nm. In more specific embodiments, nanostructures provided herein have (e.g., on average) a diameter of less than 250 nm. In specific embodiments, nanostructures provided herein have a (e.g., average) diameter of 100 nm to 1000 nm. In some embodiments, nanostructures provided herein have a (e.g., average) diameter of 500 nm or less. In some embodiments, nanostructures provided herein have a (e.g., average) diameter of 400 nm or less. In some embodiments, nanostructures provided herein have a (e.g., average) diameter of 200 nm to 500 nm. In other specific embodiments, precursor nanofibers described herein have a (e.g., average) diameter of less than 2000 nm. In more specific embodiments, electrospun precursor nanofibers described herein have a (e.g., average) diameter of 300 nm to 1500 nm.

The nanostructures have any suitable length (e.g., as determined by microscopy, such as SEM or TEM, or any other suitable technique). In some instances, a given plurality of nanostructures comprise nanostructures that have a distribution of structures of various lengths. In some embodiments, certain structures of a population exceed or fall short of the average length. In some embodiments, nanostructures provided herein have an average length of about 20 µm, about 50 µm, about 100 µm, about 500 µm, about 1,000 µm, about 5,000 µm, about 10,000 µm, about 50,000 µm, about 100,000 µm, about 500,000 µm, and the like. In some embodiments, the nanofiber has an average length of at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, and the like. In some embodiments, the nanofiber has an average length of less than about 0.2 µm, less than about 0.5 µm, less than about 1 µm, less than about 2 µm, less than about 3 µm, less than about 5 µm, less than about 10 µm, less than about 20 µm, less than about 50 µm, less than about 100 µm, less than about 500 µm, less than about 1,000 µm, less than about 5,000 µm, less than about 10,000 µm, less than about 50,000 µm, less than about 100,000 µm, less than about 500,000 µm, and the like.

The nanostructures provided herein have any suitable specific surface area (surface area divided by mass (or volume)). In some embodiments, the specific surface area of nanostructures provided herein is at least 0.1 $m^2/g$, at least 1 $m^2/g$, at least 5 $m^2/g$, at least 10 $m^2/g$, at least 50 $m^2/g$, at least 100 $m^2/g$, at least 200 $m^2/g$, at least 500 $m^2/g$, at least 1,000 $m^2/g$, at least 1,500 $m^2/g$, at least 2,000 $m^2/g$, or the like.

The nanostructures have any suitable porosity. In certain instances, a high surface area nanostructure, such as one having high porosity, provides an additive material that, when combined to form a composite, provides a material having minimal density distortions therein. In some embodiments, the porosity is about 1%, about 2%, about 4%, about 6%, about 8%, about 10%, about 15%, about 20%, about 25%, about 30%, about 40%, about 50%, about 60%, about 70% and the like. In some embodiments, the porosity is at most 1%, at most 2%, at most 4%, at most 6%, at most 8%, at most 10%, at most 15%, at most 20%, at most 25%, at most 30%, at most 40%, at most 50%, at most 60%, at most 70% and the like. In some embodiments, the porosity is at least 1%, at least 2%, at least 4%, at least 6%, at least 8%, at least 10%, at least 15%, at least 20%, at least 25%, at least 30%, at least 40%, at least 50%, at least 60%, at least 70% and the like. In some embodiments, the porosity is between about 1% and 10%, between about 10% and 50%, between about 20% and 30%, between about 30% and 70%, between about 1% and 50%, between about 5% and 20%, and the like. In certain instances, porosity is the void amount of the nanostructure divided by the theoretical volume of the nanostructure. In specific instances, porosity is determined by measuring the volume displacement caused by the nanofiber in a fluid and comparing it the theoretical volume of the nanostructure (e.g., $\pi \cdot radius^2 \cdot length$).

Methods for measuring the diameter, aspect ratio, or other dimensional characteristic of a nanostructure or nanofiber described herein may include any suitable method. Such methods include, but are not limited to microscopy, optionally transmission electron microscopy ("TEM") or scanning electron microscopy ("SEM"). Surface area may be calculated by measuring the diameter and length of nanofiber in the sample and applying the equation for the surface area of a cylinder (i.e., 2 times pi times half of the diameter of the nanofiber times the sum of the length of the nanofiber and half of the diameter of the nanofiber). Surface area may also be measured by physical or chemical methods, for example by the Brunauer-Emmett, and Teller (BET) method where the difference between physiorption and desorption of inert gas is utilized.

In certain embodiments, nanofiber nanostructures are produced by thermally treating precursor nanofibers from an aqueous fluid stock comprising polymer and metal precursor.

In some embodiments, nanostructures described herein that have an average length of at least 750 microns. In more specific embodiments, the nanostructures have an average length of at least 1 mm. In still more specific embodiments, the nanostructures have an average length of at least 1.5 mm, or at least 2 mm. In some embodiments, the nanostructures comprise a continuous metal, metal oxide, metal carbide, or ceramic matrix and have an average length of at least 1 mm (e.g., at least 1.5 mm, at least 2 mm, or at least 5 mm). In certain embodiments, the nanostructures have an average aspect ratio of at least 1,000. In specific embodiments, the nanostructures have an average aspect ratio of at least 10,000. In still more specific embodiments, the nanostructures have an average aspect ratio of at least 25,000 (e.g., at least 50,000, at least 100,000, or the like). In some embodiments, the nanostructures comprise a continuous metal, metal oxide, metal carbide, or ceramic matrix and have an average aspect ratio of at least 10,000 (e.g., at least 25,000 or at least 100,000). In some embodiments, the nanostructures comprise a continuous metal, metal oxide, metal carbide, or ceramic matrix and have an average aspect ratio of at least 10,000 (e.g., at least 25,000 or at least 100,000) and an average length of at least 1 mm (e.g., at least 1.5 mm, at least 2 mm, or at least 5 mm).

Nanostructure Properties

In certain embodiments, nanostructures provided herein have improved performance over other nano-material additives. In some instances, Young's modulus, fracture toughness, ultimate strength, electrical conductivity, thermal conductivity, flexibility, and/or other characteristics of the nanostructures described herein (and/or their composite materials) are improved over other nanostructures of the same material and/or over the bulk/sheet form of the same material. Table 1 illustrates the physical properties of certain nanostructures provided herein and the physical properties of bulk materials having similar structure.

TABLE 1

| Material | Youngs Modulus (GPa) | | Fracture Toughness (MPa · m^{1/2}) | Ultimate Strength (MPa) | | Electrical Conductivity (log(S/m)) | |
|---|---|---|---|---|---|---|---|
| | nano | bulk | | nano | bulk | nano | bulk |
| SiO₂ (amorph) | 79 | 80 | 0.71 | 41 | 33 | — | — |
| ZrO₂ | 818 | 210 | 2.15 | 2612 | 1900 | — | — |
| Cu | 608 | 117 | 4.12 | 191 | 70 | 6.6 | 7.4 |
| SiC | 1030 | 450 | 3.88 | 8120 | 3440 | 2.2 | 4.0 |

In some embodiments, nanostructures described herein have improved Young's modulus over similar materials in other nanostructure or bulk forms. In some instances, provided herein are nanostructures having a mean or median nanofiber Young's modulus-to-diameter ratio of at least 0.1 GPa/nm. In certain instances, provided herein are nanostructures having a mean or median nanofiber Young's modulus-to-diameter ratio of at least 0.13 GPa/nm. In specific instances, provided herein are nanostructures having a mean or median nanofiber Young's modulus-to-diameter ratio of at least 0.15 GPa/nm. In more specific instances, provided herein are nanostructures having a mean or median nanofiber Young's modulus-to-diameter ratio of at least 0.18 GPa/nm. In still more specific instances, provided herein are nanostructures having a mean or median nanofiber Young's modulus-to-diameter ratio of at least 0.2 GPa/nm. In yet more specific instances, provided herein are nanostructures having a mean or median nanofiber Young's modulus-to-diameter ratio of at least 0.25 GPa/nm. In specific instances, provided herein are nanostructures having a mean or median nanofiber Young's modulus-to-diameter ratio of at least 0.3 GPa/nm. In some instances, provided herein are nanostructures having a mean or median nanofiber Young's modulus-to-diameter ratio of at least 0.05 GPa/nm or at least 0.5 GPa/nm.

In some embodiments, provided herein are nanostructures having a mean or median nanofiber Young's modulus-to-bulk Young's modulus of the metal component of at least 0.8:1. In specific embodiments, nanostructures provided herein have a mean or median nanofiber Young's modulus-to-bulk Young's modulus of the metal component of at least 1:1. In more specific embodiments, nanostructures provided herein have a mean or median nanofiber Young's modulus-to-bulk Young's modulus of the metal component of at least 3:2. In still more specific embodiments, nanostructures provided herein have a mean or median nanofiber Young's modulus-to-bulk Young's modulus of the metal component of at least 2:1. In still more specific embodiments, nanostructures provided herein have a mean or median nanofiber Young's modulus-to-bulk Young's modulus of the metal component of at least 3:1. In still more specific embodiments, nanostructures provided herein have a mean or median nanofiber Young's modulus-to-bulk Young's modulus of the metal component of at least 4:1. Generally, comparisons to such bulk material involve comparisons of crystalline nanostructures to crystalline bulk material and amorphous nanostructures to amorphous bulk material.

In certain embodiments, nanostructures described herein have improved fracture toughness over similar materials in other nanostructure or bulk forms. In some instances, provided herein are nanostructures having a mean or median nanofiber fracture toughness-to-diameter ratio of at least 0.002 MPa·m^{1/2}/nm. In some instances, provided herein are nanostructures having a mean or median nanofiber fracture toughness-to-diameter ratio of at least 0.003 MPa·m$^{1/2}$/nm. In some instances, provided herein are nanostructures having a mean or median nanofiber fracture toughness-to-diameter ratio of at least 0.005 MPa·m$^{1/2}$/nm. In some instances, provided herein are nanostructures having a mean or median nanofiber fracture toughness-to-diameter ratio of at least 0.007 MPa·m$^{1/2}$/nm. In some instances, provided herein are nanostructures having a mean or median nanofiber fracture toughness-to-diameter ratio of at least 0.01 MPa·m$^{1/2}$/nm. In certain embodiments, nanostructures provided herein have a mean or median nanofiber fracture toughness of at least 0.5 MPa·m$^{1/2}$. In certain embodiments, nanostructures provided herein have a mean or median nanofiber fracture toughness of at least 0.7 MPa·m$^{1/2}$. In certain embodiments, nanostructures provided herein have a mean or median nanofiber fracture toughness of at least 0.9 MPa·m$^{1/2}$. In certain embodiments, nanostructures provided herein have a mean or median nanofiber fracture toughness of at least 1 MPa·m$^{1/2}$. In certain embodiments, nanostructures provided herein have a mean or median nanofiber fracture toughness of at least 2 MPa·m$^{1/2}$. In certain embodiments, nanostructures provided herein have a mean or median nanofiber fracture toughness of at least 3 MPa·m$^{1/2}$. In certain embodiments, nanostructures provided herein have a mean or median nanofiber fracture toughness of at least 5 MPa·m$^{1/2}$.

In certain embodiments, nanostructures described herein have improved ultimate strength over similar materials in other nanostructure or bulk forms. In certain embodiments, nanostructures provided herein have a mean or median nanofiber ultimate strength-to-bulk ultimate strength of the metal component of at least 0.8:1. In some embodiments, nanostructures provided herein have a mean or median nanofiber ultimate strength-to-bulk ultimate strength of the metal component of at least 1:1. In specific embodiments, nanostructures provided herein have a mean or median nanofiber ultimate strength-to-bulk ultimate strength of the metal component of at least 1.2:1. In more specific embodiments, nanostructures provided herein have a mean or median nanofiber ultimate strength-to-bulk ultimate strength of the metal component of at least 1.5:1. In still more specific embodiments, nanostructures provided herein have a mean or median nanofiber ultimate strength-to-bulk ultimate strength of the metal component of at least 2:1. In still more specific embodiments, nanostructures provided herein have a mean or median nanofiber ultimate strength-to-bulk ultimate strength of the metal component of at least 3:1.

Figure 12:
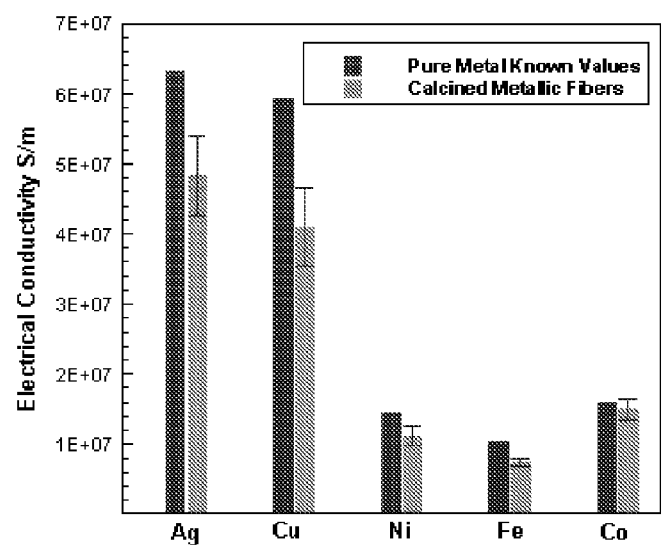
FIG. 12 illustrates the electrical conductivity of certain metal nanostructures provided herein (and their relative values compared to known bulk values for the same metals).
Figure 13A:
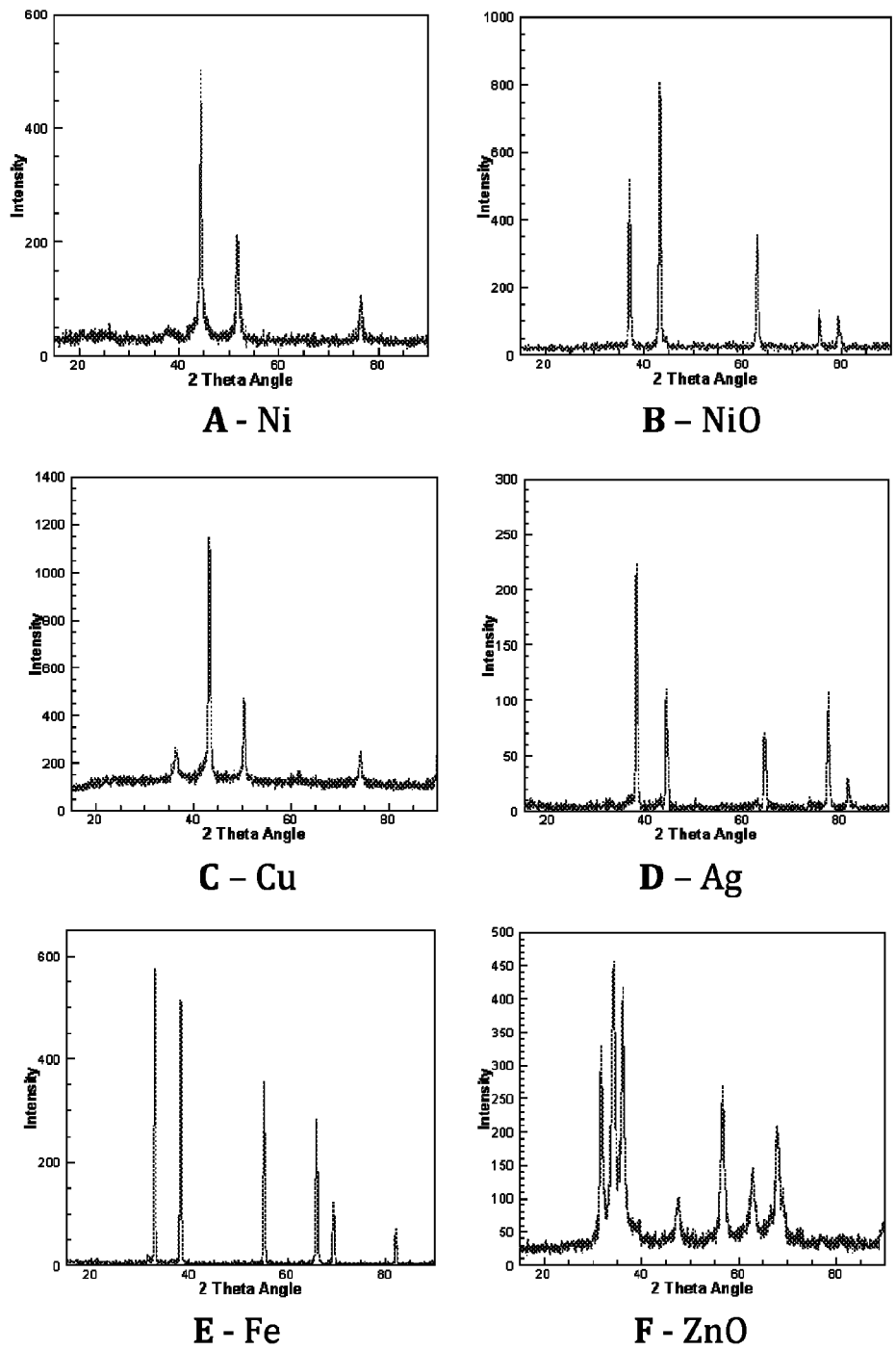
FIG. 13 illustrates the X-Ray Diffraction (XRD) data for exemplary metal, metal oxide, and nanocomposite nanostructures provided herien.
Figure 13B:
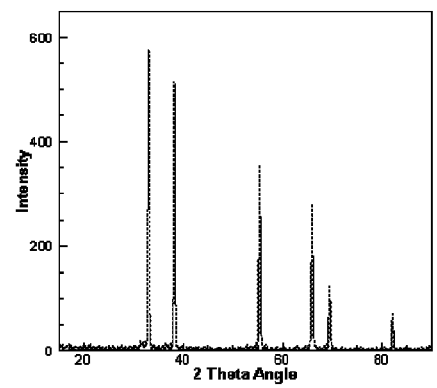
Figure 13B:
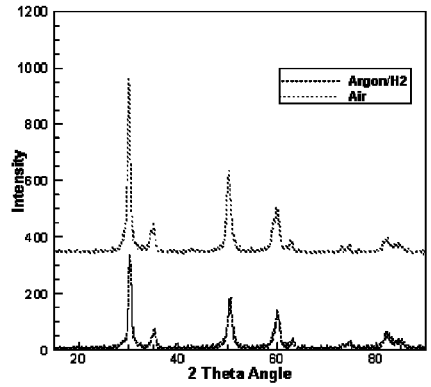
Figure 13B:
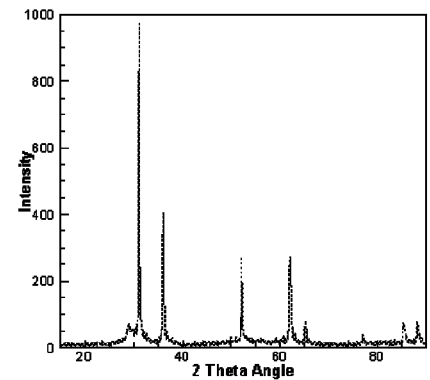
Figure 13B:
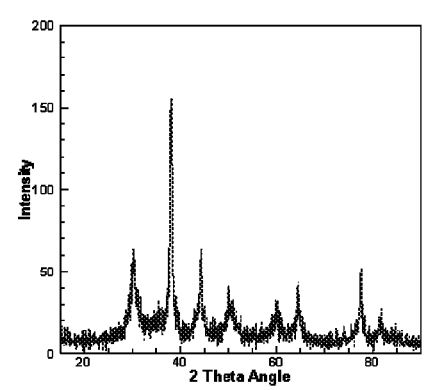
Figure 13B:
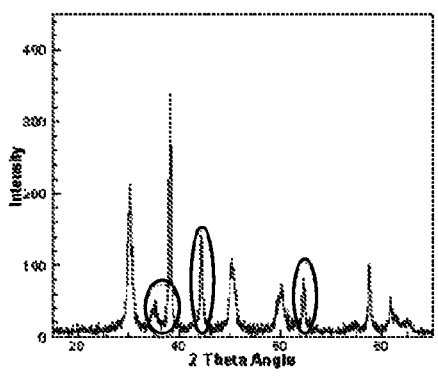
Figure 13B:
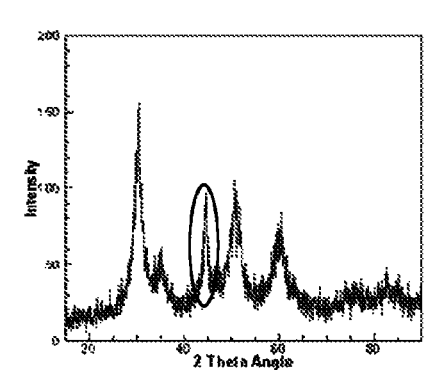
Figure 13C:
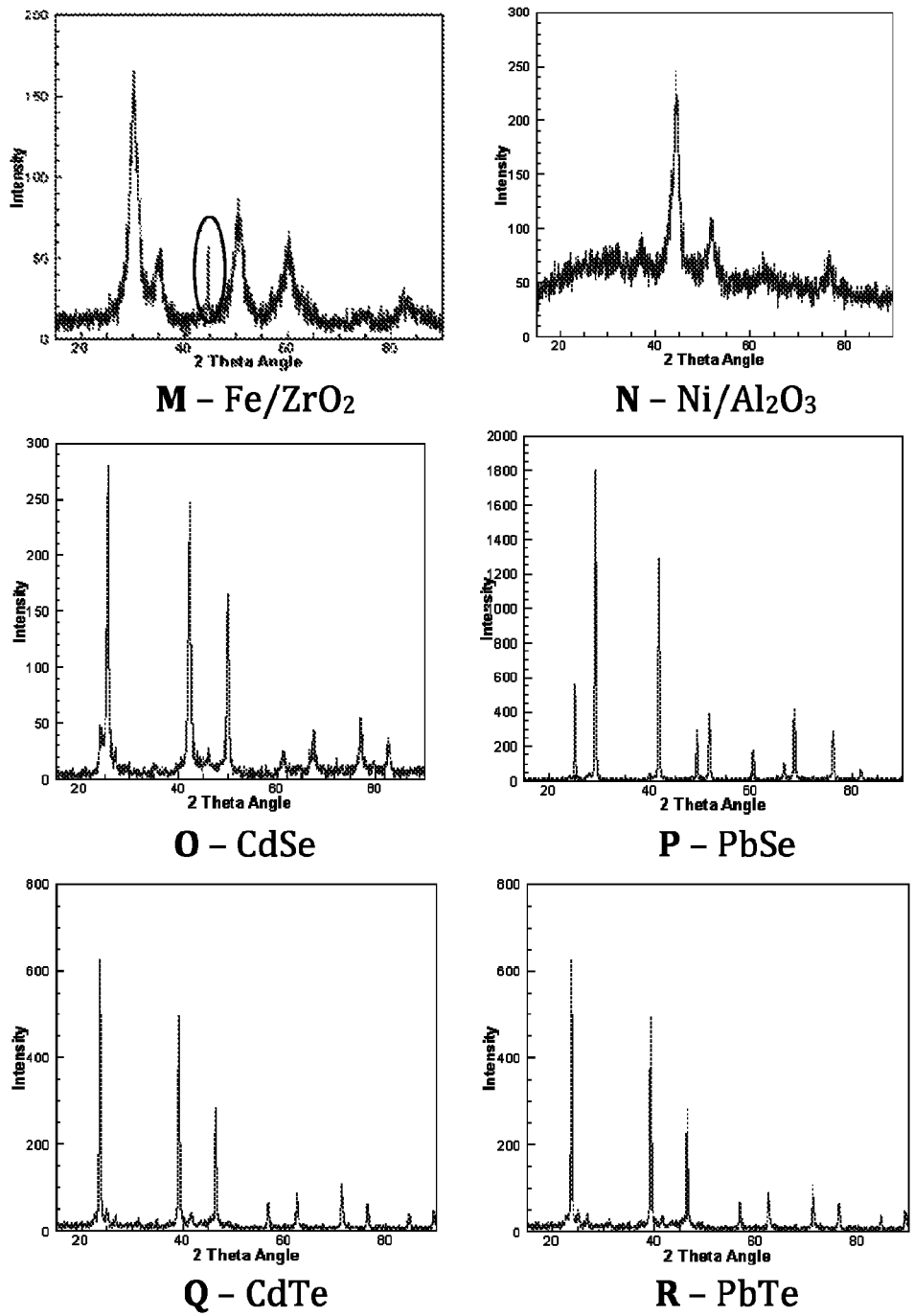

In some embodiments, nanostructures provided herein have (an average) electrical conductivity of at least 5%, at least 10%, at least 20%, at least 30%, at least 40%, at least 50%, at least 60%, at least 70%, at least 80%, at least 90%, at least 95%, at least 100%, at least 110%, at least 120%, at least 130%, at least 150%, or at least 200% when compared with the conductivity of the bulk material (e.g., when formed into a sheet). In some embodiments, the conductivity is at least 1 S/cm, at least 10 S/cm, at least 100 S/cm, at least 10$^3$ S/cm, at least 10$^4$ S/cm, at least 10$^5$ S/cm, at least 10$^6$ S/cm, at least 10$^7$ S/cm, at least 10$^8$ S/cm, and the like. In some embodiments, the conductivity is between about 1 S/cm and 10 S/cm, between about 10 S/cm and 100 S/cm, between about 100 S/cm and 1,000 S/cm, between about 1,000 S/cm and 10$^4$ S/cm, between about 10$^4$ S/cm and 10$^5$ S/cm, between about 10$^5$ S/cm and 10$^6$ S/cm, between about 10$^6$ S/cm and 10$^7$ S/cm, between about 10$^7$ S/cm and 10$^8$ S/cm, between about 10$^5$ S/cm and 10$^8$ S/cm, and the like. For example, FIG. 12 illustrates the electrical conductivity of certain nanostructures described herein relative to their corresponding bulk material.

In some embodiments, the nanostructures or composite comprising nanostructures of the present disclosure are flexible. In some instances, flexible nanofibers are advantageous in certain applications. In some instances, flexibility is quantified by the Young's modulus, which is the slope of the initial linear portion of a stress-strain curve. The Young's modulus has units of pressure, such as mega Pascals (MPa). In some embodiments, flexibility is different along different directions of the material, so may be reported with respect to a certain direction, or is reported as an average value. The nanostructures have any suitable flexibility. In some embodiments, the nanostructures has a Young's modulus of at least 10 MPa, at least 100 MPa, at least 250 MPa, at least 500 MPa, at least 1,000 MPa, at least 4,000 MPa, at least 6,000 MPa, at least 8,000 MPa, or the like.

In some embodiments, provided herein are reinforcing additives comprising nanofiber nanostructures having the matrix material described and anyone one or more of characteristics set forth in Table 2:

TABLE 2

| Continuous Matrix Material | Youngs Modulus (GPa) | Fracture Toughness (MPa · m$^{1/2}$) | Ultimate Strength (MPa) | Electrical Conductivity (log(S/m)) | | |
|---|---|---|---|---|---|---|
| amorphous metal oxide or ceramic | ≥50 | ≥75 | ≥0.7 | ≥35 | ≥40 | — | — |
| crystalline ceramic | ≥500 | ≥750 | ≥2 | ≥2000 | ≥2500 | — | — |
| metal | ≥200 | ≥500 | ≥4 | ≥100 | ≥150 | ≥3 | ≥5 |
| metal carbide | ≥500 | ≥1000 | ≥3 | ≥4000 | ≥8000 | ≥1 | ≥2 |

Metals

In certain embodiments, provided herein are nanostructures (e.g., nanofiber nanostructures) comprising one or more zero oxidation state metal (a metal described herein, generally refers to a zero oxidation state metal, unless otherwise stated). In spefic embodiments, the nanostructures comprise a single zero oxidation state metal. In general, the metal may be any suitable metal, such as one of those described herein. In some embodiments, the metal (i.e., zero oxidation state metal) is Fe, Ti, Si, Ag, Cu, Ni, Co, Au, Al, Zr, Hf, Mn, Ru, Rh, Zn, Cd, Sn, or Ge. In specific embodiments, the nanostructures comprise zero oxidation state metal. In more specific embodiments, the one or more zero oxidation state metal is nickel (Ni). In other embodiments, the one or more zero oxidation state metal is copper (Cu). In still other embodiments, the one or more zero oxidation state metal is silver (Ag). In yet other embodiments, the one or more zero oxidation state metal is iron (Fe). In still other embodiments, the one or more zero oxidation state metal is lead (Pb). In yet other embodiments, the one or more zero oxidation state metal is cobalt (Co). In other embodiments, the nanostructures comprise zero oxidation state metalloid. In specific embodiments, the zero oxidation state metalloid is silicon.

In some embodiments, the one or more zero oxidation state metal is a metal alloy. In specific embodiments, the metal alloy is a carbon alloy, a selenium alloy, a metal-metal alloy, a metal-metal oxide alloy, a tellurium alloy, or the like. In general, the alloy may comprise any suitable metal, in combination with a second component, such as carbon, selenium, tellurium, a non-metal, additional metal(s), metal oxides, or any other suitable component. In specific embodiments, the metal alloy comprises Fe, Ti, Si, Ag, Cu, Ni, Co, Au, Al, Zr, Li, Mg, Ca, Hf, Mn, Ru, Rh, Zn, Cd, Sn, Ge, or any combination thereof.

Such structures may have any of the performance characteristics described herein. Exemplary performance characteristics of metal nanostructures described herein are described throughout this disclosure and below.

In certain embodiments, the nanostructures comprise (e.g., on average) at least 50 wt. % zero oxidation state metal. In specific embodiments, the nanostructures comprise (e.g., on average) at least 60 wt. % zero oxidation state metal. In more specific embodiments, the nanostructures comprise (e.g., on average) at least 75 wt. % zero oxidation state metal. In still more specific embodiments, the nanostructures comprise (e.g., on average) at least 90 wt. % zero oxidation state metal. In yet more specific embodiments, the nanostructures comprise (e.g., on average) at least 95 wt. % zero oxidation state metal. In specific embodiments, the nanostructures comprise (e.g., on average) at least 98 wt. % zero oxidation state metal. In more specific embodiments, the nanostructures comprise (e.g., on average) at least 99 wt. % zero oxidation state metal.

In certain embodiments, the nanostructures comprise (e.g., on average) least 50 elemental wt. % metal, when taken together. In more specific embodiments, metal constitutes, on average, at least 60 elemental wt. % of the nanostructure(s). In still more specific embodiments, metal constitutes, on average, at least 75 elemental wt. % of the nanostructure(s). In yet more specific embodiments, metal constitutes, on average, at least 80 elemental wt. % of the nanostructure(s). In more specific embodiments, metal constitutes, on average, at least 90 elemental wt. % of the nanostructure(s). In various embodiments, metal constitutes, on average, at least 40 elemental wt. %, at least 70 elemental wt. %, at least 85 elemental wt. %, at least 95 elemental wt. %, at least 97 elemental wt. %, at least 98 elemental wt. %, or at least 99 elemental wt. % of the nanostructure(s).

In some embodiments, nanostructures provided herein have (an average) electrical conductivity of at least 50%, at least 60%, at least 70%, at least 80%, at least 90%, at least 95%, at least 100%, at least 110%, at least 120%, at least 130%, at least 150%, or at least 200% when compared with the conductivity of the bulk material (e.g., when formed into a sheet).

In some embodiments, provided herein are nanostructures having a mean or median nanofiber Young's modulus-to-diameter ratio of at least 0.2 GPa/nm. In specific instances, provided herein are nanostructures having a mean or median nanofiber Young's modulus-to-diameter ratio of at least 0.25 GPa/nm. In more specific instances, provided herein are nanostructures having a mean or median nanofiber Young's modulus-to-diameter ratio of at least 0.3 GPa/nm. In still more specific instances, provided herein are nanostructures having a mean or median nanofiber Young's modulus-to-diameter ratio of at least 0.5 GPa/nm. In some embodiments, provided herein are nanostructures having a mean or median nanofiber Young's modulus of at least 100 GPa. In specific instances, provided herein are nanostructures having a mean or median nanofiber Young's modulus of at least 200 GPa. In more specific instances, provided herein are nanostructures having a mean or median nanofiber Young's modulus of at least 300 GPa. In still more specific instances, provided herein are nanostructures having a mean or median nanofiber Young's modulus of at least 500 GPa.

In certain embodiments, nanostructures provided herein have a mean or median nanofiber ultimate strength-to-bulk ultimate strength of the metal component of at least 1:1. In more specific embodiments, nanostructures provided herein have a mean or median nanofiber ultimate strength-to-bulk ultimate strength of the metal component of at least 2:1.

Metal Oxides/Ceramics

In certain embodiments, provided herein are nanostructures (e.g., nanofiber nanostructures) comprising one or more metal having an oxidation state of greater than zero. In spefic embodiments, the nanostructures comprise a single metal component having an oxidation state of greater than zero. In specific embodiments, the metal component is a metal oxide (e.g., a ceramic). In general, the metal oxide may be an oxide of any suitable metal(s), metalloid(s), or combination thereof. Exemplary metals include those described herein. In some embodiments, the metal oxide is an oxide of Fe, Ti, Si, Ag, Cu, Ni, Co, Au, Al, Zr, Hf, Mn, Ru, Rh, Zn, Cd, Sn, Ge, or a combination thereof. In specific embodiments, the nanostructures comprise an oxidized metal. In more specific embodiments, the oxidized metal is an oxide of nickel (Ni). In other embodiments, the oxidized metal is an oxide of copper (Cu). In still other embodiments, the oxidized metal is an oxide of zinc (Zn). In yet other embodiments, the oxidized metal is an oxide of zirconium (Zr). In still other embodiments, the oxidized metal is an oxide of titanium (Ti). In yet other embodiments, the oxidized metal is an oxide of cobalt (Co). In yet other embodiments, the one or more zero oxidation state metal is barium (Ba). In specific embodiments, the oxidized metalloid is an oxide of silicon (e.g., silica).

Such structures may have any of the performance characteristics described herein. Exemplary performance characteristics of metal oxide (e.g., ceramic) nanostructures described herein are described throughout this disclosure and below.

In certain embodiments, the metal oxide (e.g., ceramic) is in an amorphous state. In specific embodiments, nanostructures provided herein comprise a continuous matrix of amorphous metal oxide (e.g., ceramic). For example a continuous matrix within a nanostructure is continuous along at least 50% of the length of the nanostructure (i.e., the longest dimentions of the nanostructure). In more specific embodiments, the continuous matrix runs along at least 70% of the length of the nanostructure. In still more specific embodiments, the continuous matrix runs along at least 80% of the length of the nanostructure. In yet more specific embodiments, the continuous matrix runs along at least 90% of the length of the nanostructure. In specific embodiments, the continuous matrix runs along at least 95% of the length of the nanostructure. In more specific embodiments, the continuous matrix runs along at least 98% of the length of the nanostructure. In yet more specific embodiments, the continuous matrix runs along at least 99% of the length of the nanostructure.

In certain embodiments, the nanostructures comprise (e.g., on average) at least 50 wt. % metal oxide. In specific embodiments, the nanostructures comprise (e.g., on average) at least 60 wt. % metal oxide. In more specific embodiments, the nanostructures comprise (e.g., on average) at least 75 wt. % metal oxide. In still more specific embodiments, the nanostructures comprise (e.g., on average) at least 90 wt. % metal oxide. In yet more specific embodiments, the nanostructures comprise (e.g., on average) at least 95 wt. % metal oxide. In specific embodiments, the nanostructures comprise (e.g., on average) at least 98 wt. % metal oxide 1. In more specific embodiments, the nanostructures comprise (e.g., on average) at least 99 wt. % metal oxide.

In certain embodiments, the nanostructures comprise (e.g., on average) least 50 elemental wt. % metal. In more specific embodiments, metal constitutes, on average, at least 60 elemental wt. % of the nanostructure(s). In still more specific embodiments, metal constitutes, on average, at least 75 elemental wt. % of the nanostructure(s). In yet more specific embodiments, metal constitutes, on average, at least 80 elemental wt. % of the nanostructure(s). In more specific embodiments, metal constitutes, on average, at least 90 elemental wt. % of the nanostructure(s). In various embodiments, metal constitutes, on average, at least 40 elemental wt. %, at least 70 elemental wt. %, at least 85 elemental wt. %, at least 95 elemental wt. %, at least 97 elemental wt. %, at least 98 elemental wt. %, or at least 99 elemental wt. % of the nanostructure(s).

In some embodiments, provided herein are nanostructures comprising an amorphous ceramic and having a mean or median nanofiber Young's modulus-to-diameter ratio of at least 0.2 GPa/nm. In specific instances, provided herein are nanostructures an amorphous ceramic and having a mean or median nanofiber Young's modulus-to-diameter ratio of at least 0.25 GPa/nm. In more specific instances, provided herein are nanostructures an amorphous ceramic and having a mean or median nanofiber Young's modulus-to-diameter ratio of at least 0.3 GPa/nm.

In certain embodiments, nanostructures provided herein comprise an amorphous ceramic and have a mean or median nanofiber ultimate strength-to-bulk ultimate strength of the metal component of at least 1:1. In more specific embodiments, nanostructures provided herein comprise an amorphous ceramic and have a mean or median nanofiber ultimate strength-to-bulk ultimate strength of the metal component of at least 1.2:1.

In certain embodiments, the metal oxide (e.g., ceramic) is in a crystalline state. In specific embodiments, nanostructures provided herein comprise a continuous matrix of crystalline metal oxide (e.g., ceramic). For example a continuous matrix within a nanostructure is continuous along at least 50%, at least 70%, at least 80%, at least 90%, at least 95%, at least 98%, or at least 99% of the length of the nanostructure.

In some embodiments, provided herein are nanostructures comprising a crystalline metal oxide (e.g., ceramic) and having a mean or median nanofiber Young's modulus-to-diameter ratio of at least 1 GPa/nm. In specific instances, provided herein are nanostructures comprising a crystalline ceramic and having a mean or median nanofiber Young's modulus-to-diameter ratio of at least 1.5 GPa/nm. In more specific instances, provided herein are nanostructures an crystalline metal oxide (e.g., ceramic) and having a mean or median nanofiber Young's modulus-to-diameter ratio of at least 2 GPa/nm.

In certain embodiments, nanostructures provided herein comprise a crystalline metal oxide (e.g., ceramic) and have a mean or median nanofiber ultimate strength-to-bulk ultimate strength of the metal component of at least 1:1. In more specific embodiments, nanostructures provided herein comprise a crystalline metal oxide (e.g., ceramic) and have a mean or median nanofiber ultimate strength-to-bulk ultimate strength of the metal component of at least 1.2:1.

In some instances, provided herein are metal oxide (e.g., ceramic) containing nanostructures having a mean or median nanofiber fracture toughness-to-diameter ratio of at least $0.002$ MPa·m$^{1/2}$/nm. In some instances, provided herein are nanostructures having a mean or median nanofiber fracture toughness-to-diameter ratio of at least 0.003 MPa·m$^{1/2}$/nm. In some instances, provided herein are nanostructures having a mean or median nanofiber fracture toughness-to-diameter ratio of at least 0.005 MPa·m$^{1/2}$/nm. In some instances, provided herein are nanostructures having a mean or median nanofiber fracture toughness-to-diameter ratio of at least 0.007 MPa·m$^{1/2}$/nm.

Carbides

In some embodiments, nanofibers described herein have improved Young's modulus over similar materials in other nanostructure or bulk forms. In some instances, provided herein are nanofibers having a mean or median nanofiber Young's modulus-to-diameter ratio of at least 0.1 GPa/nm. In certain instances, provided herein are nanofibers having a mean or median nanofiber Young's modulus-to-diameter ratio of at least 0.5 GPa/nm. In specific instances, provided herein are nanofibers having a mean or median nanofiber Young's modulus-to-diameter ratio of at least 1 GPa/nm. In more specific instances, provided herein are nanofibers having a mean or median nanofiber Young's modulus-to-diameter ratio of at least 2 GPa/nm. In still more specific instances, provided herein are nanofibers having a mean or median nanofiber Young's modulus-to-diameter ratio of at least 3 GPa/nm. In yet more specific instances, provided herein are nanofibers having a mean or median nanofiber Young's modulus-to-diameter ratio of at least 4 GPa/nm. In specific instances, provided herein are nanofibers having a mean or median nanofiber Young's modulus-to-diameter ratio of at least 5 GPa/nm. In some instances, provided herein are nanofibers having a mean or median nanofiber Young's modulus-to-diameter ratio of at least 0.05 GPa/nm or at least 10 GPa/nm.

In some embodiments, nanofibers described herein have improved fracture toughness over similar materials in other nanostructure or bulk forms. In some instances, provided herein are nanofibers having a mean or median nanofiber fracture toughness-to-diameter ratio of at least 1 MPa/nm. In certain instances, provided herein are nanofibers having a mean or median nanofiber fracture tougness-to-diameter ratio of at least 5 MPa/nm. In specific instances, provided herein are nanofibers having a mean or median nanofiber fracture toughness-to-diameter ratio of at least 10 MPa/nm. In more specific instances, provided herein are nanofibers having a mean or median nanofiber fracture toughness-to-diameter ratio of at least 15 MPa/nm. In still more specific instances, provided herein are nanofibers having a mean or median nanofiber fracture toughness-to-diameter ratio of at least 20 MPa/nm. In yet more specific instances, provided herein are nanofibers having a mean or median nanofiber fracture toughness-to-diameter ratio of at least 30 MPa/nm. In specific instances, provided herein are nanofibers having a mean or median nanofiber Young's modulus-to-diameter ratio of at least 40 MPa/nm. In some instances, provided herein are nanofibers having a mean or median nanofiber Young's modulus-to-diameter ratio of at least 0.1 MPa/nm or at least 50 MPa/nm.

In some embodiments, the average electrical conductivity of a nanofiber provided herein has a log(S/m) to log(S/m) ratio with an identical bulk material of at least 0.3 (i.e., log of the electrical conductivity along the length of the nanofiber divided by log of the electrical conductivity of the same material, in bulk—e.g., sheet form). In specific embodiments, the average electrical conductivity of a nanofiber provided herein has a log(S/m) to log(S/m) ratio with an identical bulk material of at least 0.4. In more specific embodiments, the average electrical conductivity of a nanofiber provided herein has a log(S/m) to log(S/m) ratio with an identical bulk material of at least 0.5. In still more specific embodiments, the average electrical conductivity of a nanofiber provided herein has a log(S/m) to log(S/m) ratio with an identical bulk material of at least 0.55. In certain embodiments, the average electrical conductivity of a nanofiber provided herein is at least 1 log(S/m), at least 1.5 log(S/m), at least 2 log(S/m), or the like. In some embodiments, a nanofiber provided herein has a conductivity of at least about 5%, at least about 10%, at least about 20%, at least about 30%, at least about 40%, at least about 50%, or the like when compared with the conductivity of the material when formed into a sheet. The nanofibers have any suitable electrical conductivity. In various embodiments, electrical conductivity is measured as an average value, at a specific condition, or along a specific direction of the nanofiber sample. In some embodiments, the conductivity at least 1 S/cm, at least 10 S/cm, at least 100 S/cm, at least $10^3$ S/cm, at least $10^4$ S/cm, or the like.

Nanostructure Composite

In certain embodiments, provided herein is a composite comprising a plurality of nanostructures described herein in combination with a composite matrix material. Depending on the type of properties intended to impart to the composite, different nanostructures described herein may be utilized. By way of non-limiting example, in certain instances amorphous ceramics are utilized in flexible composites, crystalline ceramics are ulitized in high strength, low flexibility, and/or insulating composites, metals are used in conductive composites, carbides are used in for stiff, tough, and/or high strength composites, and the like.

Composites provided herein optionally include any suitable amount of the nanostructures described herein. For example, in certain embodiments, nanostructures or nanostructure compositions (e.g., additive compositions) provided herein comprise less than 30% by weight of the plurality of nanostructures.

A composite material provided herein may use any suitable matrix material. By way of non-limiting example, the matrix material optionally comprises a polymer, a metal, a ceramic, a carbide, or the like.

In specific embodiments, the matrix material is a polymer, such as a thermoset, thermoplastic, resin, or the like. In more specific embodiments, thermosets include, by way of non-limiting example, unsaturated polyesters, vinyl esters, epoxies, phenolics, polyeurethanes, and the like. In certain embodiments, thermoplastics include, by way of non-limiting embodiment, polyolefins, such as polyethylene (PE, e.g., HDPE), polypropylene (PP), polyvinylchloride (PVC), polystyrene (PS), and the like. In certain embodiments, composites are prepared using any suitable techniques, including, e.g., molding, casting, compounding, or the like.

In some embodiments, the composite matrix material is a metal, such as an elemental metal, such as aluminum or iron, or a metal alloy, such as steel or stainless steel. In certain embodiments, the matrix material is a ceramic, such as silica, zirconia, titania, or the like. In some embodiments, the matrix material is a carbide, such as silicon carbide. In some embodiments, the composite matrix and the nanostructures (additive) comprise the same material. In other embodiments, the composite matrix comprises a different material than the nanostructures (additive).

Process

Also provided herein are various processes that may be utilized for preparing the nanostructures described herein. Nanostructures made according to the processes described herein are also considered herein. For example, provided herein are nanostructures produced by treating precursor nanofibers that have been electrospun from an aqueous fluid stock, the fluid stock comprising polymer and metal precursor. In specific instances, nanostructures described herein are prepared from electrospun precursor nanofibers—e.g., following treatment (such as thermal treatment) and/or fracturing of the nanofibers. In some instances, such nanofibers improved performance characteristics (such as fracture toughness, electrical and thermal conductivity, etc.) compared to other nanostructure formation techniques, such as those used to make nanowires, including deposition, precipitation, crystal growth techniques.

In some embodiments, provided herein is a process for producing a nanostructure (e.g., for use as a reinforcing additive), the process comprising:

a. electrospinning a first fluid stock into an electrospun material, the first fluid stock comprising (i) a polymer and (ii) a metal reagent component (e.g., nanoparticles of at least one metal component, such as a metal oxide, metal precursor, or a combination thereof);

b. treating the electrospun material to provide a nanofiber nanostructure.

In specific embodiments, the first fluid stock comprises at least one metal precursor. In more specific embodiments, the first fluid stock comprises at least one metal precursor and a plurality of nanoparticles comprising a metal component (e.g., a zero oxidation state metal, a metal oxide, or the like).

In certain embodiments, treatment of the electrospun material comprises thermal treatment of the electrospun material. In some embodiments, treatment of the electrospun material comprises chemical treatment of the electrospun material. In specific embodiments, chemical treatment of the electrospun material comprises exposing the electrospun material to oxidative conditions (e.g., air, $O_2$, peroxide, or the like). In some embodiments, oxidative conditions are utilized to conver the metal precursor into a metal oxide (e.g., ceramic). In other specific embodiments, chemical treatment of the electrospun material comprises exposing the electrospun material to reducing conditions (e.g., $H_2$, or the like). In certain embodiments, treatment of the electrospun material comprises both thermal and chemical treatment. In some embodiments, treatment of the electrospun material is performed under an intert atmosphere (e.g., $N_2$, Ar, or the like).

In some embodiments, thermal treatment (e.g., calcination) is performed at about 100° C., about 150° C., about 200° C., about 300° C., about 400° C., about 500° C., about 600° C., about 700° C., about 800° C., about 900° C., about 1,000° C., about 1,500° C., about 2,000° C., and the like. In some embodiments, calcination is performed at a temperature of at least 100° C., at least 150° C., at least 200° C., at least 300° C., at least 400° C., at least 500° C., at least 600°

C., at least 700° C., at least 800° C., at least 900° C., at least 1,000° C., at least 1,500° C., at least 2,000° C., and the like. In some embodiments, thermal treatment (e.g., calcination) is performed at a temperature of at most 100° C., at most 150° C., at most 200° C., at most 300° C., at most 400° C., at most 500° C., at most 600° C., at most 700° C., at most 800° C., at most 900° C., at most 1,000° C., at most 1,500° C., at most 2,000° C., and the like. In some embodiments, thermal treatment (e.g., calcination) is performed at a temperature of between about 300° C. and 800° C., between about 400° C. and 700° C., between about 500° C. and 900° C., between about 700° C. and 900° C., between about 800° C. and 1,200° C., and the like. In some embodiments, thermal treatment (e.g., calcination) is performed at a constant temperature. In some embodiments, the temperature changes over time. Thermal treatment (e.g., calcination) is performed for any suitable amount of time (e.g., as necessary to arrive at a nanofiber nanostructure with the desired properties). In some instances, treatment (e.g., thermal treatment) of the electrospun nanofiber allows the carbonaceous and organic material to be removed from the resultant treated nanofiber nanostructure. In other instances, treatment (e.g., thermal treatment) of the electrospun nanofiber allows the carbonaceous material (polymer) in proximity to the precursor to react with the precursor, resulting in a metal carbide. In some instances, formation of a carbide is achieved by thermal treatment at a temperature above the temperature required to simply degrade/decompose and remove the organic material (e.g., at a temperature of about 1,000° C. to about 1,700° C.). In more specific embodiments, carbonization of the polymer and reaction of the carbonized polymer with the metal reagent component comprises heating the nanofiber at a temperature suitable to carbonize the polymer and cause the carbonized polymer to react with the metal component. In certain embodiments, the nanofiber is heated to a temperature of about 900° C. to about 2000° C., at least 900° C., at least 1000° C., or the like. In specific embodiments, the nanofiber is heated to a temperature of about 1000° C. to about 1800° C., or about 1000° C. to about 1700° C. In some instances, thermal treatment is performed at a suitable temperature to convert the metal reagent component (e.g., metal precursor) into the metal component and at least partially convert the organic material (e.g., polymer) into a carbon matrix (e.g., an amorphous continuous carbon matrix) (e.g., at a temperature of about 400° C. to about 1400° C. under inert conditions). In more specific embodiments, carbonization of the polymer to a continuous carbon matrix comprises heating the nanofiber at a temperature suitable to carbonize the polymer, but not high enough to remove the polymer and/or cause the carbonized polymer to react with the metal or metal reagent component. In certain embodiments, the nanofiber is heated to a temperature of about 400 to about 1400° C. In specific embodiments, the nanofiber is heated to a temperature of about 400° C. to about 1200° C., or about 600° C. to about 1200° C.

In some embodiments, treatment is performed at a constant or variable temperature. In some embodiments, the treatment conditions comprise using a temperature gradient. In some embodiments, the temperature increases from a first temperature (e.g., the temperature of the electrospinning process, optionally room temperature) to a second temperature. In certain embodiments, treatment conditions comprise utilization of a temperature increase during the treatment process. In some instances, the rate of temperature increase is any suitable rate, for example about 1° C./min to about 35° C./min. In some embodiments, the treatment occurs for any suitable amount of time. In specific embodiments, the dwell time at the maximum (second) temperature occurs for 10 minutes to 20 hours, or any other suitable amount of time.

In some embodiments, treatment procedures are performed under inert conditions (e.g., under argon or nitrogen). In some instances, treatment procedures are performed under reducing conditions (e.g., under hydrogen, or a mixture of hydrogen and argon). In some embodiments, if a metal component that is a metal is desired, treatment procedures are performed under such reducing or inert conditions. In further embodiments, treatment procedures are performed under oxidative conditions (e.g., under air or other oxygen containing gases). In some embodiments, if a metal component that is a metal oxide or ceramic is desired, treatment procedures are performed under oxidative conditions. In some embodiments, treatment conditions include gaseous conditions, liquid conditions, or the like.

In some instances, a process described herein further comprises electrospinning a second fluid about a common axis with the first fluid stock, whereby electrospinning the first and second fluid together provide the electrospun material. In some instances, common-axial (co-axial) electrospinning of a first and second fluid stock provide a layered hybrid structure, such as one described herein. In some of such instances, the second fluid stock comprises a metal precursor and a polymer in an aqueous medium. In some embodiments, treatment (e.g., thermal and/or chemical treatment) of the precursor material or layer electrospun from the second fluid stock serves to convert the metal precursor into a metal component described herein. Alternatively, the second fluid is a gas, which assists production and drying of an electrospun nanofiber comprising precursor material. Hollow nanofibers are optionally produced by using a second fluid that is a gas and that is electrospun about a common axis with the first fluid and the first fluid is outside the second fluid (i.e., the first fluid is further from the common axis than the second fluid).

In some embodiments, a process provided herein further comprises functionalizing the surface of the electrospun material or of the treated material. In some instances, such functionalization is achieved through further thermal treatment and/or chemical treatment.

In certain embodiments, a process provided herein further comprises fracturing the electrospun or treated material. In some instances, fracturing of the treated, electrospun material provides a tunable process for preparing nanostructures with a desired aspect ratio and/or length. In various embodiments, fracturing of the electrospun or treated material is achieved via any suitable process. In specific embodiments, such processes include, by way of non-limiting example, steps of sonicating, pressuring, grinding, chemical etching, laser irradiation, or any combination thereof the electrospun or treated material.

In one aspect, the process has a high yield (e.g., which is desirable for embodiments in which the precursor is expensive). In some embodiments, the metal atoms in the nanostructure(s) are about 10%, about 20%, about 30%, about 33%, about 40%, about 50%, about 60%, about 70%, about 80%, about 90%, about 95%, about 98%, or about 100% of the number of (e.g., in moles) metal molecules in the fluid stock (i.e., present in the metal reagent components thereof). In some embodiments, the metal atoms in the nanostructures are at least 10%, at least 20%, at least 30%, at least 33%, at least 40%, at least 50%, at least 60%, at least 70%, at least 80%, at least 90%, at least 95%, at least 98%, or at least 99% of the moles of metal molecules in the fluid stock. In some embodiment, the moles of precursor molecules in the nanostructure are between about 10% and about 40%, between about 20% and about 50%, or between about 50% and about 100% of the moles of metal molecules in the fluid stock.

FIG. 1 illustrates an exemplary schematic of a process described herein. In some instances, a first composition comprising metal reagent component 101 (e.g., metal precursor, such as an acetate of Ag, Al, Co, Fe, Ni, Zn, Zr, Si, etc.) is combined 102 with a second composition comprising a polymer 103 (e.g., PVA, PVAc, PVEO, etc.) to prepare a fluid stock 104 (e.g., comprising a metal reagent component and polymer—unassociated, partially associated, or completely associated with metal reagent component). In some instances, a fluid stock provided herein is electrospun using an electrospinning apparatus, such as a syringe system 105, through a nozzle 106, wherein the nozzle is optionally heated and may optionally comprise a coaxially aligned gas nozzle for expressing gas along the same longitudinal axis as the fluid stock jet (i.e., the precursor nanofiber). In certain embodiments, electrospinning of the fluid stock produces a precursor nanofiber 108, comprising metal precursor and polymer (e.g., in a weight ratio of over 1:2 and up to 4:1), the precursor nanofiber being collected on a collector 107. Treatment 109 (e.g., thermal and/or chemical treatment, producing nanofiber nanostructures, followed by optional fragmentation of the nanofiber nanostructures) of the precursor nanofiber 108 may then be performed (e.g., with a heater and/or in a reaction vessel/chamber) to produce nanostructure product 110.

Figure 2:
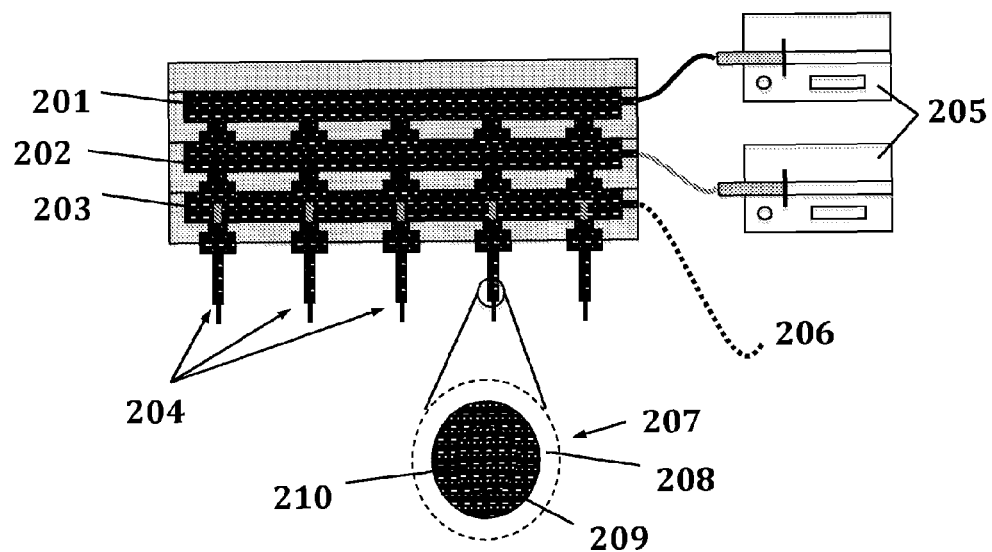
FIG. 2 illustrates a coaxial electrospinning apparatus useful for producing nanostructures described herein.

FIG. 2 illustrates an exemplary schematic of a process or apparatus described herein, particularly for preparing a layered nanocomposite nanostructures by a coaxial gas assisted electrospinning process. In some instances, a first fluid stock 201 (e.g., comprising a metal reagent component and a polymer), is electrospun with an optional second fluid stock 202 (e.g., comprising a second metal precursor and a second polymer, the second precursor and polymer independently being either the same or different from the first), and a third fluid (e.g., gas) 203. The fluid stocks may be provided to the apparatus by any device, e.g., by a syringe 205. And the gas may be provided from any source 206 (e.g., air pump). In some embodiments such an apparatus comprises a plurality of co-axial needles 204. Exemplary needles, as illustrates by the cross section 207, comprise an outer sheath tube 208 (e.g., having a supply end and a nozzle end), at least one intermediate tube 209 (e.g., having a supply end and a nozzle end), and a core tube 210 (e.g., having a supply end and a nozzle end). In specific instances, each of the tubes are coaxially aligned (i.e., aligned along the substantially same axis). In certain embodiments, such a process may be utilized to prepare a nanofiber comprising a core and a layer. In some embodiments, the intermediate tube may be absent and a fluid stock may be electrospun in a gas-assisted manner (i.e., the sheath tube provides a high velocity gas). In other embodiments, the fluid stock may be electrospun from the sheath tube, the intermediate tube may be absent and the gas may be provided from the core tube (e.g., to produce a hollow nanofiber, which may be further treated/processed according to the techniques described herein to produce a hollow nanostructure). In some instances, the tube or nozzle end of any tube (e.g., any tube providing a fluid stock is) heated or capable of being heated. In some instances, heating of the nozzle provides for improved electrospinning performance and/or electrospun nanofiber morphology.

Fluid Stock Components

In certain embodiments, the first fluid stock comprises at least one polymer and at least one metal reagent component (e.g., metal precursor). In specific embodiments, the first fluid stock comprises an aqueous medium. In some embodiments, the fluid stock comprises at least one metal precursor in association with one or more of the at least one polymer.

In some embodiments, high loading of metal reagent component (e.g., concentration and/or relative to polymer) and homogeneity in fluid stocks and/or precursor nanofibers facilitate and/or provide pure and/or uniform nanostructures following treatment. In certain instances, few defects and/or voids are created in the nanofiber when upon treatment compared to the number of defects and/or voids created when having lower precursor loading.

In various embodiments, the fluid stock comprises a substantially uniform and/or homogenous dispersion or solution (e.g., as measured by viscosity deviations, UV absorbance, or the like). In some embodiments, the fluid stock is aqueous (i.e., comprises water). In certain instances, use of water in the fluid stock facilitates the dispersion of the metal reagent component (e.g., metal precursor), facilitates forming metal reagent component-polymer associations in the fluid stock, and facilitates forming a uniform and/or homogenous dispersion/solution.

In some embodiments, the fluid stock uniform or homogenous. In specific embodiments, the process described herein comprises maintaining fluid stock uniformity or homogeneity. In some embodiments, fluid stock uniformity and/or homogeneity is achieved or maintained by any suitable mechanism, e.g., by agitating, heating, or the like. Methods of agitating include, by way of non-limiting example, mixing, stirring, shaking, sonicating, or otherwise inputting energy to prevent or delay the formation of more than one phase in the fluid stock. In some embodiments, the fluid stock is continually agitated. In some embodiments, the fluid stock is agitated to create a uniform dispersion or solution, which is then used in an electrospinning step before the fluid stock (e.g., dispersion or solution) loses uniformity and/or homogeneity (e.g., it before it separates into more than one phase).

In some embodiments, a fluid stock is prepared by (i) dissolving or dispersing a metal reagent (e.g., precursor) in a first fluid (e.g., water, or another aqueous medium) to form a first composition; (ii) dissolving or dispersing a polymer in a second fluid (e.g., water, or another aqueous medium) to form a second composition; and (iii) combining at least a portion of the first and second compositions to form the fluid stock.

Figure 3:
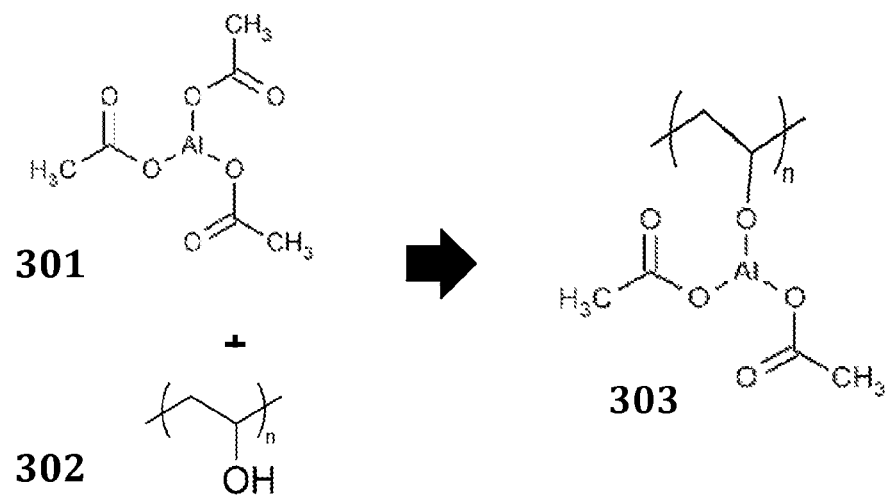
FIG. 3 illustrates an exemplary mechanism for loading of metal precursor onto polymer (e.g., in an aqueous medium).

In some embodiments, a fluid stock provided herein is prepared by combining a metal reagent component and a polymer in an aqueous medium (e.g., in water). In some embodiments, a metal reagent component is combined with the polymer in a metal reagent component to polymer weight-to-weight ratio of at least 1:2 (e.g., at least 1:1). In certain embodiments, a first metal reagent component is combined with a polymer, forming an association (e.g., via a ligand replacement reaction) between the polymer and a second metal reagent component (e.g., a metal-ligand complex wherein one of the ligands of the first metal reagent component is replaced with a polymer moiety). In some embodiments, a fluid stock provided herein may comprise both first and second metal reagent components (e.g., polymer-associated and non-associated metal reagent components). For the purposes of concentration and embodiments herein, reference to a metal reagent component encompasses any metal reagent component present in the fluid stock, whether it is associated with the polymer or not. Similarly, polymer concentration and embodiments provided herein encompass polymer in associated and non-associated forms. Reference to the polymer refers only to the polymer moiety of such an association, and reference to the precursor refers to the precursor moiety of such an association. FIG. 3 illustrates an exemplary metal reagent precursor 301 combined with a polymer 302 to provide a metal precursor-polymer association 303. In some instances such an association process may be complete (i.e., all metal reagent precursor and/or polymer reactive sites may be associated), and in other instances, some of the metal reagent precursor and/or polymer reactive sites (e.g., —OH groups for the PVA of FIG. 3) may remain unassociated. In other words, in some instances, x hydroxyl groups of the PVA may be associated with the precursor, and n-x hydroxyl groups may remain unassociated. Such associations may be monitored in any suitable manner, e.g., by infrared (IR) spectrometry, nuclear magnetic resonance (NMR) spectrometry, mass spectrometry (MS, e.g., GCMS), or the like.

In some aspects, the polymer is soluble in water, meaning that it forms a solution in water. In other embodiments, the polymer is swellable in water, meaning that upon addition of water to the polymer the polymer increases its volume up to a limit Water soluble or swellable polymers are generally at least somewhat hydrophilic. In some embodiments, a polymer described herein is a polymer that is electrophilic or nucleophilic. In some instances, a nucleophilic or electrophilic polymer is matched with a complementary precursor (e.g., a nucleophilic polymer, such as PVA, is matched with a electrophilic precursor, such as a metal acetate). Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like).

In certain embodiments, the polymer is a nucleophilic polymer (e.g., a polymer comprising alcohol groups, such as PVA). In some embodiments, the polymer is a nucleophilic polymer and a first precursor (e.g., reagent precursor) is an electrophilic precursor (e.g., a metal acetate, metal chloride, or the like). In specific embodiments, the precursor-polymer association is a reaction product between a nucleophilic polymer and an electrophilic first precursor (e.g., reagent precursor).

In other embodiments, the polymer is an electrophilic polymer (e.g., a polymer comprising chloride or bromide groups, such as polyvinyl chloride). In some embodiments, the polymer is an electrophilic polymer and a first precursor (e.g., reagent precursor) is a nucleophilic precursor (e.g., metal-ligand complex comprising "ligands" with nucleophilic groups, such as alcohols or amines). In specific embodiments, the precursor-polymer association is a reaction product between an electrophilic polymer and a nucleophilic first precursor.

In some embodiments, the polymer imparts a suitable elongational viscosity to the fluid stock for electrospinning nanofibers. In some embodiments, low shear viscosity leads to beaded nanofibers. In one aspect, uniform distribution of the precursor in the fluid feed helps to maintain a suitably high elongational viscosity.

Generally, a fluid stock provided herein has a fluidity and viscosity suitable for electrospinning. In some embodiments, a fluid stock provided herein is a solution, a dispersion, or the like. In specific embodiments, a or all fluid stocks used in a process herein are aqueous fluid stocks (with optional gas fluid(s) also electrospun about a common axis). Viscosity is a measure of the resistance of a fluid which is being deformed by either shear stress or tensile stress. Viscosity is measured in units of poise. In various embodiments, the viscosity of the polymer or fluid stock is measured with or without associated precursor. The polymer or fluid stock has any suitable elongational viscosity. In some embodiments, the polymer or fluid stock has an elongational viscosity of about 50 poise, about 100 poise, about 200 poise, about 300 poise, about 400 poise, about 500 poise, about 600 poise, about 800 poise, about 1000 poise, about 1500 poise, about 2000 poise, about 2500 poise, about 3000 poise, about 5,000 poise, and the like. In some embodiments, the polymer or fluid stock has an elongational viscosity of at least 50 poise, at least 100 poise, at least 200 poise, at least 300 poise, at least 400 poise, at least 500 poise, at least 600 poise, at least 800 poise, at least 1,000 poise, at least 1,500 poise, at least 2,000 poise, at least 2,500 poise, at least 3,000 poise, at least 5,000 poise, and the like. In some embodiments, the polymer or fluid stock has an elongational viscosity of at most 50 poise, at most 100 poise, at most 200 poise, at most 300 poise, at most 400 poise, at most 500 poise, at most 600 poise, at most 800 poise, at most 1,000 poise, at most 1,500 poise, at most 2,000 poise, at most 2,500 poise, at most 3,000 poise, at most 5,000 poise, and the like. In some embodiments, the polymer or fluid stock has an elongational viscosity of between about 100 and 3,000 poise, or between about 1,000 and 5,000 poise, and the like.

Molecular weight is related to the mass of the monomers comprising the polymer and the degree of polymerization. In some embodiments, molecular weight is a factor that affects viscosity. The polymer has any suitable molecular weight. In some embodiments, the polymer has a molecular weight of at least 20,000 atomic mass units ("amu"), at least 50,000 amu, at least 100,000 amu, at least 200,000 amu, at least 300,000 amu, at least 400,000 amu, at least 500,000 amu, at least 700,000 amu, or at least 1,000,000 amu and the like. In some embodiments, the polymer has a molecular weight of at most 20,000 amu, at most 50,000 amu, at most 100,000 amu, at most 200,000 amu, at most 300,000 amu, at most 400,000 amu, at most 500,000 amu, at most 700,000 amu, or at most 1,000,000 amu and the like. In some embodiments, the polymer has a molecular weight of about 20,000 amu, about 50,000 amu, about 100,000 amu, about 200,000 amu, about 300,000 amu, about 400,000 amu, about 500,000 amu, about 700,000 amu, or about 1,000,000 amu and the like. In yet other embodiments, the polymer has a molecular weight of from about 50,000 amu to about 1,00,000 amu, from about 100,000 amu to about 500,000 amu, from about 200,000 amu to about 400,000 amu, or from about 500,000 amu to about 1,00,000 amu and the like.

The polydispersity index ("PDI") is a measure of the distribution of molecular mass in a given polymer sample. The PDI is the weight average molecular weight divided by the number average molecular weight, which is calculated by formula known to those skilled in the art of polymer science. The polymer has any suitable polydispersity index. In some embodiments, the polymer has a polydispersity index of about 1, about 2, about 3, about 4, about 5, about 6, about 7, about 8, about 9, about 10, about 15, about 20, and the like. In some embodiments, the polymer has a polydispersity index of at least 1, at least 2, at least 3, at least 4, at least 5, at least 6, at least 7, at least 8, at least 9, at least 10, at least 15, at least 20, and the like. In some embodiments, the polymer has a polydispersity index of at most 1, at most 2, at most 3, at most 4, at most 5, at most 6, at most 7, at most 8, at most 9, at most 10, at most 15, at most 20, and the like. In some embodiments, the polymer has a polydispersity index of about 1 to about 10, about 2 to about 5, and the like.

In some examples, high loading of precursor on the polymer in the fluid stock is beneficial for obtaining pure and/or uniform nanofibers. As described herein, few defects and/or voids are created in the nanofiber when the polymer is removed compared to the number of defects and/or voids created when having lower precursor loading. In some instances, loading is represented as the weight ratio of the metal reagent component to polymer in the fluid stock or precursor nanofiber (the metal reagent component being in associated and/or non-associated form). The weight ratio of the metal reagent component to polymer is any value resulting in a nanofiber with suitable properties in a given embodiment. The weight ratio of the metal reagent component to polymer is at least 1:2 in some embodiments. In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of metal reagent component and polymer. In some embodiments, there is more metal reagent component than polymer by weight. In some embodiments, the weight ratio of the metal reagent component to polymer is at least 1.25:1, at least 1.5:1, at least 1.75:1, at least 2:1, at least 3:1, or at least 4:1. In yet other embodiments, the weight ratio of metal reagent component to polymer is about 1:2 to about 5:1, or about 1:1 to about 4:1. In some embodiments, all or part of the metal reagent component is associated with the polymer and the metal reagent component to polymer weight-to-weight ratio is determined by the ratio of the sum of the associated and non-associated metal reagent component to the polymer.

The fluid stock contains any suitable amount of polymer. The weight percent of polymer in the fluid stock is represented as the weight percent of polymer (whether the polymer is associated with metal reagent or not). In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer. In some embodiments, the fluid stock comprises from about 1 weight % to about 20 weight % polymer. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer.

In certain embodiments, polymer concentration in the fluid stock is determined on a monomeric residue concentration. In other words, the concentration of the polymer is determined based on the concentration of polymeric repeat units present in the stock. For example, polymer concentration of polyvinyl alcohol may be measured based on the concentration of ($-CH_2CHOH-$) present in the fluid stock. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In at least 5 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the monomeric residue in the fluid stock is between 5 mM and 5 M, between 200 mM and 1 M, between 100 mM and 700 mM, and the like. In some embodiments, the concentration of metal reagent (e.g., precursor) in the fluid stock to monomeric residue in the fluid stock is at least 1:4. In specific embodiments, the concentration of metal reagent (e.g., precursor) in the fluid stock to monomeric residue in the fluid stock is at least 1:3. In more specific embodiments, the concentration of metal reagent (e.g., precursor) in the fluid stock to monomeric residue in the fluid stock is at least 1:2. In still more specific embodiments, the concentration of metal reagent (e.g., precursor) in the fluid stock to monomeric residue in the fluid stock is at least 1:1.2. In yet more specific embodiments, the concentration of metal reagent (e.g., precursor) in the fluid stock to monomeric residue in the fluid stock is about 1:1 (e.g., within 5%). In other embodiments, the concentration of metal reagent (e.g., precursor) in the fluid stock to monomeric residue in the fluid stock is at least 1:10, at least 1:8, at least 1:6, at least 1:1.5, at least 1:3.5, at least 1:2.5, or any suitable ratio.

In some embodiments, the fluid stock comprises metal reagent (e.g., precursor) and polymer, wherein at least 5 elemental wt. % of the total mass of the metal reagent (e.g., precursor) and polymer is metal. In certain embodiments, at least 10 elemental wt. % of the total mass of the metal reagent (e.g., precursor) and polymer is metal. In specific embodiments, at least 15 elemental wt. % of the total mass of the metal reagent (e.g., precursor) and polymer is metal. In more specific embodiments, at least 20 elemental wt. % of the total mass of the metal reagent (e.g., precursor) and polymer is metal. In specific embodiments, at least 25 elemental wt. % of the total mass of the metal reagent (e.g., precursor) and polymer is metal. In still more specific embodiments, at least 30 elemental wt. % of the total mass of the metal reagent (e.g., precursor) and polymer is metal. In yet more specific embodiments, at least 35 elemental wt. % of the total mass of the metal reagent (e.g., precursor) and polymer is metal. In more specific embodiments, at least 40 elemental wt. % of the total mass of the metal reagent (e.g., precursor) and polymer is metal. In various embodiments, at least 10 elemental wt. %, at least 15 elemental wt. %, at least 45 elemental wt. %, at least 50 elemental wt. % of the total mass of the metal reagent (e.g., precursor) and polymer is metal.

In one aspect, the concentration of metal reagent (e.g., precursor) in the fluid stock is high. The concentration is any suitable concentration. In some embodiments, the concentration of the metal reagent (e.g., precursor) in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the metal reagent (e.g., precursor) in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the metal reagent (e.g., precursor) in the fluid stock is between 5 mM and 5 mM, between 20 mM and 1 M, between 100 mM and 700 mM, between 100 mM and 300 mM, and the like.

Figure 4:
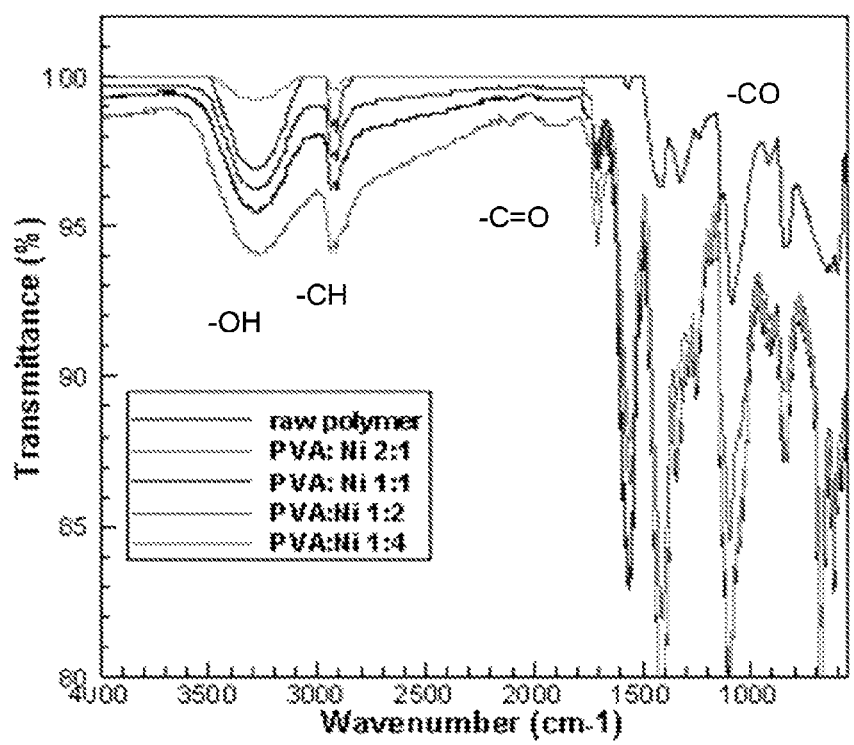
FIG. 4 illustrates an FTIR spectrum demonstrating the increased loading of metal precursor onto polymer (PVA).

In some embodiments, the fluid stock and/or precursor nanofiber comprises a high loading of metal reagent component. In some embodiments, the polymer is at least 20% loaded with metal reagent component (i.e., at least 20% of the reactive sites of the polymer are associated with a metal reagent component). In specific embodiments, the polymer is at least 35% loaded with metal reagent component. In more specific embodiments, the polymer is at least 50% loaded with metal reagent component. In still more specific embodiments, the polymer is at least 75% loaded with metal reagent component. In various embodiments, the polymer is at least 20%, at least at least 30%, at least 40%, at least 50%, at least 60%, at least 70%, at least 75%, at least 80%, at least 85%, at least 85%, at least 90%, at least 95%, at least 96%, at least 97%, at least 98%, or at least 99% loaded with metal reagent component. In some instances, the polymer is about 50% to 100%, about 70% to 100%, about 90% to 100%, about 50% to about 90%, about 60% to about 80%, or about 20% to about 50% loaded with metal reagent component. In some embodiments, the metal reagent component present in the fluid stock or precursor nanofiber is at least 80% associated with the polymer. In more specific embodiments, the precursor present in the fluid stock is at least 90% associated with the polymer. In still more specific embodiments, the precursor present in the fluid stock is at least 95% associated with the polymer. In other specific embodiments, the precursor present in the fluid stock is at least 20%, at least 30%, at least 40%, at least 50%, at least 60%, at least 70%, at least 75%, at least 85%, at least 98%, or at least 99% associated with the polymer. Loading and/or association between metal reagent component and polymer can be determined by any suitable mechanism, e.g., nuclear magnetic resonance (NMR) spectrometry, infrared (IR) spectrometry, or the like. For example, FIG. 4 illustrates the increased loading of precursor on the polymer (e.g., by the decreasing intensity of the —OH peak).

Any suitable precursor is optionally utilized in any processes described herein. In some embodiments, the precursor is a metal-ligand (e.g., complex, salt, or the like). In some embodiments, precursors include metal associations with acetate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrite, triphenylphosphate, cyanide, carbon monoxide, or alkyl-oxide. In specific examples, the precursor is a metal-ligand such as metal acetate (e.g., $Al(OCOCH_3)_3$), metal chloride, metal nitrate, or metal alkyl-oxide. In specific embodiments, the metal precursor is a metal-ligand association (complex) (e.g., a coordination complex), each metal precursor comprising metal atom(s) associated (complexed) with one or more ligand(s) (e.g., 1-10, 2-9, or any suitable number of ligands). In specific embodiments, the precursor described herein comprises at least two different types of ligand (e.g., at least one acetate and at least one halide). In some embodiments, the precursor is a metal carboxylate (e.g., —$OCOCH_3$ or another —OCOR group, wherein R is an alkyl, substituted alkyl, aryl, substituted aryl, or the like). In certain embodiments, the precursor is a metal nitrate. In some embodiments, the precursor is a metal alkoxide (e.g., a methoxide, ethoxide, isopropyl oxide, t-butyl oxide, or the like). In some embodiments, the precursor is a metal halide (e.g., chloride, bromide, or the like). In certain embodiments, the precursor is a diketone (e.g., acetylacetone, hexafluoroacetylacetone, or the like). In other embodiments, any suitable ligand may be utilized in a metal-ligand association (metal precursor) described herein, e.g., ketones, diketones (e.g., a 1,3-diketone, such as ROCCHR'COR group, wherein R is an alkyl, substituted alkyl, aryl, substituted aryl and R' is R or H), carboxylates (e.g., acetate or —OCOR group, wherein each R is independently an alkyl, substituted alkyl, aryl, substituted aryl), halides, nitrates, amines (e.g., $NR'_3$, wherein each R" is independently R or H or two R", taken together form a heterocycle or heteroaryl), and combinations thereof. Further examples include iodide, bromide, sulfide (e.g., —SR), thiocyanate, chloride, nitrate, azide, fluoride, hydroxide, oxalate, water, nitrite (e.g., $RN_3$), isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. Metals for such metal reagent components (e.g., metal precursors) are any suitable metal, including those as described herein for the metal component.

In some instances, there is some cross-linking between polymers, e.g., through a metal reagent component. In some embodiments, the polymers of a fluid stock described herein are less than 20% cross-linked (e.g., less than 20% of the metal reagent component are associated with 2 or more polymers and/or less than 20% of the monomeric units of the polymer are connected, e.g., via a metal reagent component, to another polymer). In some embodiments, the polymers are less than 10% cross-linked. In specific embodiments, the polymers are less than 5% cross-linked. In more specific embodiments, the polymers are less than 3% cross-linked. In still more specific embodiments, the polymers are less than 2% cross-linked. In yet more specific embodiments, the polymers are less than 1% cross-linked In some embodiments, precursor nanofibers provided herein comprise a polymer and (e.g., on average) at least 5 elemental wt. % metal. In certain embodiments, precursor nanofibers provided herein comprise a polymer and (e.g., on average) at least 10 elemental wt. % metal. In specific embodiments, precursor nanofibers provided herein comprise a polymer and (e.g., on average) at least 15 elemental wt. % metal. In more specific embodiments, precursor nanofibers provided herein comprise a polymer and (e.g., on average) at least 20 elemental wt. % metal. In specific embodiments, metal constitutes (e.g., on average) at least 25 elemental wt. % precursor nanofiber(s). In still more specific embodiments, metal constitutes (e.g., on average) at least 30 elemental wt. % of the precursor nanofiber(s). In yet more specific embodiments, metal constitutes (e.g., on average) at least 35 elemental wt. % of the precursor nanofiber(s). In more specific embodiments, metal constitutes (e.g., on average) at least 40 elemental wt. % of the precursor nanofiber(s). In various embodiments, metal constitutes (e.g., on average) at least 10 elemental wt. %, at least 15 elemental wt. %, at least 45 elemental wt. %, at least 50 elemental wt. % of the precursor nanofiber(s).

In some embodiments, an electrospun precursor nanofiber comprises metal reagent component and polymer, wherein the metal reagent component and polymer when taken together make up at least 50%, at least 60%, at least 70%, at least 80%, at least 90%, at least 95%, or at least 98% of the total mass of the nanofiber.

In some instances, a process of preparing nanostructures may leave defects such as gaps, voids, and the like in the resultant nanofiber. In some embodiments, these defects are reduced by increasing the proportion of metal reagent component in the fluid stock and/or precursor/electrospun nanofiber relative to the amount of polymer. In some embodiments, increasing homogeneity of the fluid stock reduces the voids and/or defects in the nanofiber compared to when the fluid stock is not homogenous. In some instances, when the fluid feed is electrospun and converted to a nanofiber, use of homogenous fluid feed leads to a homogenous electrospun nanofiber.

In some embodiments, associating the precursor with the polymer, such as through a chemical bond between the precursor and polymer results in long, high quality nanofibers with few defects compared to embodiments without an association between the precursor and polymer. In some instances, the precursor is distributed relatively homogenously on the polymer (e.g., such that electrospinning of the fluid stock having such homogenous associations provides nanofibers with few voids and defects). In addition to the association, it is advantageous in some embodiments to first create a homogenous solution of precursor before combining the precursor and polymer.

Electrospinning

In some embodiments, the process comprises electrospinning a fluid stock. Any suitable method for electrospinning is used. In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any method known to those skilled in the art.

In some embodiments, electrospinning is achieved by electrospinning a fluid stock through a nozzle apparatus, the nozzle apparatus having an inner needle and an outer needle (e.g., wherein the inner and outer needles are arranged concentrically or along a common axis). In some embodiments, the fluid stock is electrospun through the inner needle, while the outer needle provides a gas, e.g., so as to provide gas assistance to the electrospinning process. In some embodiments, the inner needle has any suitable inner diameter, such as 0.05 to 1 mm (and, e.g., an outer diameter of 0.2 to 1.5 mm), and the outer needle having any suitable inner diameter (which is greater than the outer diameter of the inner needle), such as 0.7 to 2 mm. The gas applied to, or provided by, the outer needle has any suitable velocity, such as 50 m/s to 1,000 m/s, or 200 m/s to 500 m/s. The flow rate of any fluid stock provided herein (e.g., to the inner needle) is any suitable rate (e.g., the rate may be much higher with common axial gas assistance than would otherwise be possible) $1\times10^{-11}$ to $1\times10^{-9}$ m/s. Any suitable charge is applied to the nozzle apparatus (e.g., to the inner needle) and/or the collector. For example, a change of +5 kV to +30 kV (e.g., about +20 kV) is optionally applied to the collector. Further, any suitable distance between the nozzle apparatus and the collector is optionally utilized (e.g., 5-25 cm, about 10 cm, or the like).

In specific embodiments, the process comprises coaxial electrospinning (electrospinning two or more fluids about a common axis). As described herein, coaxial electrospinning a first fluid stock as described herein (i.e., comprising a metal reagent component and a polymer) with a second fluid is used to add coatings, make hollow nanofibers, make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning) In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock having the characteristics as described herein (i.e., comprising a polymer and metal reagent component according to the instant disclosure).

The term "alkyl" as used herein, alone or in combination, refers to an optionally substituted straight-chain, or optionally substituted branched-chain saturated or unsaturated hydrocarbon radical. Examples include, but are not limited to methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl and the like. Whenever it appears herein, a numerical range such as "$C_1$-$C_6$ alkyl," means that: in some embodiments, the alkyl group consists of 1 carbon atom; in some embodiments, 2 carbon atoms; in some embodiments, 3 carbon atoms; in some embodiments, 4 carbon atoms; in some embodiments, 5 carbon atoms; in some embodiments, 6 carbon atoms. The present definition also covers the occurrence of the term "alkyl" where no numerical range is designated. In certain instances, "alkyl" groups described herein include linear and branched alkyl groups, saturated and unsaturated alkyl groups, and cyclic and acyclic alkyl groups.

The term "aryl" as used herein, alone or in combination, refers to an optionally substituted aromatic hydrocarbon radical of six to about twenty ring carbon atoms, and includes fused and non-fused aryl rings. A fused aryl ring radical contains from two to four fused rings, where the ring of attachment is an aryl ring, and the other individual rings are alicyclic, heterocyclic, aromatic, heteroaromatic or any combination thereof. Further, the term aryl includes fused and non-fused rings containing from six to about twelve ring carbon atoms, as well as those containing from six to about ten ring carbon atoms. A non-limiting example of a single ring aryl group includes phenyl; a fused ring aryl group includes naphthyl, phenanthrenyl, anthracenyl, azulenyl; and a non-fused bi-aryl group includes biphenyl.

The term "heteroaryl" as used herein, alone or in combination, refers to optionally substituted aromatic monoradicals containing from about five to about twenty skeletal ring atoms, where one or more of the ring atoms is a heteroatom independently selected from among oxygen, nitrogen, sulfur, phosphorous, silicon, selenium and tin but not limited to these atoms and with the proviso that the ring of the group does not contain two adjacent O or S atoms. Where two or more heteroatoms are present in the ring, in some embodiments, the two or more heteroatoms are the same as each another; in some embodiments, some or all of the two or more heteroatoms are be different from the others. The term heteroaryl includes optionally substituted fused and non-fused heteroaryl radicals having at least one heteroatom. The term heteroaryl also includes fused and non-fused heteroaryls having from five to about twelve skeletal ring atoms, as well as those having from five to about ten skeletal ring atoms. In some embodiments, bonding to a heteroaryl group is via a carbon atom; in some embodiments, via a heteroatom. Thus, as a non-limiting example, an imidiazole group is attached to a parent molecule via any of its carbon atoms (imidazol-2-yl, imidazol-4-yl or imidazol-5-yl), or its nitrogen atoms (imidazol-1-yl or imidazol-3-yl). Further, in some embodiments, a heteroaryl group is substituted via any or all of its carbon atoms, and/or any or all of its heteroatoms. A fused heteroaryl radical contains from two to four fused rings, where the ring of attachment is a heteroaromatic ring. In some embodiments, the other individual rings are alicyclic, heterocyclic, aromatic, heteroaromatic or any combination thereof. A non-limiting example of a single ring heteroaryl group includes pyridyl; fused ring heteroaryl groups include benzimidazolyl, quinolinyl, acridinyl; and a non-fused bi-heteroaryl group includes bipyridinyl. Further examples of heteroaryls include, without limitation, furanyl, thienyl, oxazolyl, acridinyl, phenazinyl, benzimidazolyl, benzofuranyl, benzoxazolyl, benzothiazolyl, benzothiadiazolyl, benzothiophenyl, benzoxadiazolyl, benzotriazolyl, imidazolyl, indolyl, isoxazolyl, isoquinolinyl, indolizinyl, isothiazolyl, isoindolyloxadiazolyl, indazolyl, pyridyl, pyridazyl, pyrimidyl, pyrazinyl, pyrrolyl, pyrazinyl, pyrazolyl, purinyl, phthalazinyl, pteridinyl, quinolinyl, quinazolinyl, quinoxalinyl, triazolyl, tetrazolyl, thiazolyl, triazinyl, thiadiazolyl and the like, and their oxides, such as for example pyridyl-N-oxide.

The term "heteroalkyl" as used herein refers to optionally substituted alkyl structure, as described above, in which one or more of the skeletal chain carbon atoms (and any associated hydrogen atoms, as appropriate) are each independently replaced with a heteroatom (i.e. an atom other than carbon, such as though not limited to oxygen, nitrogen, sulfur, silicon, phosphorous, tin or combinations thereof), or heteroatomic group such as though not limited to —O—O—, —S—S—, —O—S—, —S—O—, =N—N=, —N=N—, —N=N—NH—, —P(O)2-, —O—P(O)2-, —P(O)2-O—, —S(O)—, —S(O)2-, —SnH2- and the like.

The term "heterocyclyl" as used herein, alone or in combination, refers collectively to heteroalicyclyl groups. Herein, whenever the number of carbon atoms in a heterocycle is indicated (e.g., C1-C6 heterocycle), at least one non-carbon atom (the heteroatom) must be present in the ring. Designations such as "C1-C6 heterocycle" refer only to the number of carbon atoms in the ring and do not refer to the total number of atoms in the ring. Designations such as "4-6 membered heterocycle" refer to the total number of atoms that are contained in the ring (i.e., a four, five, or six membered ring, in which at least one atom is a carbon atom, at least one atom is a heteroatom and the remaining two to four atoms are either carbon atoms or heteroatoms). For heterocycles having two or more heteroatoms, in some embodiments, those two or more heteroatoms are the same; in some embodiments, they are different from one another. In some embodiments, heterocycles are substituted. Non-aromatic heterocyclic groups include groups having only three atoms in the ring, while aromatic heterocyclic groups must have at least five atoms in the ring. In some embodiments, bonding (i.e. attachment to a parent molecule or further substitution) to a heterocycle is via a heteroatom; in some embodiments, via a carbon atom.

In specific embodiments, a "substituted" group is optionally substituted with one or more of H, halo, CN, OH, $NO_2$, $NH_2$, NH(alkyl) or N(alkyl)(alkyl), $SO_2$alkyl, $CO_2$-alkyl, alkyl, heteroalkyl, alkoxy, S-alkyl, cycloalkyl, heterocycle, aryl, or heteroaryl.

EXAMPLES

Example 1

Preparing a Fluid Stock of Nickel Acetate and PVA

Two (2) grams of nickel acetate, the metal precursor, was dissolved in 20 ml of 1 molar acetic acid solution. The solution was stirred for 2 hours to create a solution of nickel acetate. The solution was homogenous.

In a second solution, 1 gram of 99.7% hydrolyzed polyvinyl alcohol (PVA) with an average molecular weight of 79 kDa and polydispersity index of 1.5 was dissolved in 10 ml of de-ionized water. The polymer solution was heated to a temperature of 95° C. and stirred for 2 hours to create a homogenous solution.

The nickel acetate solution was then combined with the PVA solution to create a fluid stock. In order to distribute the precursor substantially evenly in the fluid stock, the precursor solution was added gradually to the polymer solution while being continuously vigorously stirred for 2 hours. The mass ratio of precursor to polymer for the fluid feed (based on initial nickel acetate mass) was 2:1.

Example 2

Characterization of a Fluid Stock of Nickel Acetate and PVA

The chemical interaction between the ligand of the metal precursor and the functional group in the polymer backbone resulted in extremely high loading of metal precursors without losing the spinnability. The interaction was demonstrated in the FT-IR study for nanofibers with various ratios of PVA to Ni precursor. As demonstrated in FIG. 4, the reduction of —OH bond and increase in —CO bond were observed at high loading of Ni precursor (Ni:PVA=4:1).

Example 3

Electrospinning a Fluid Stock of Nickel Acetate and PVA

Figure 5:
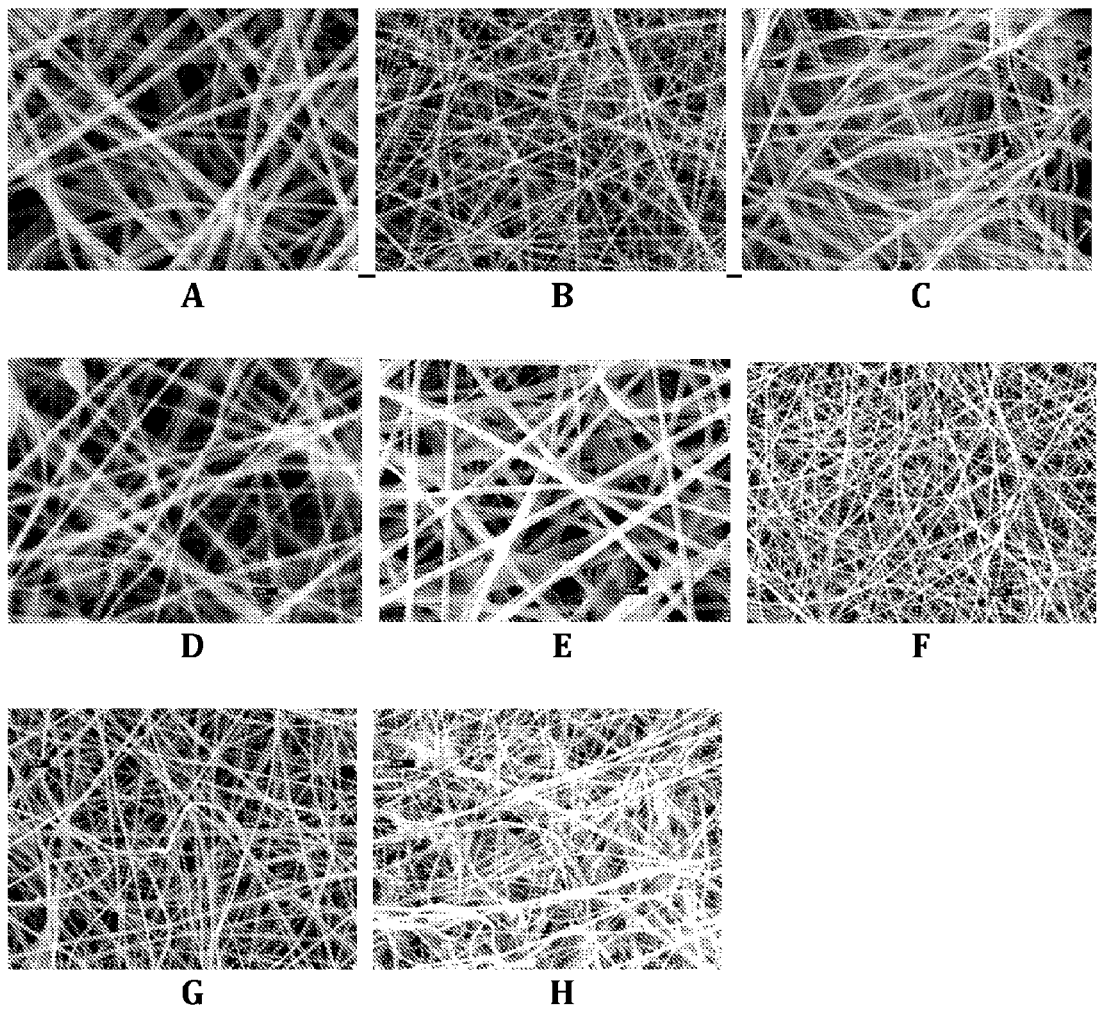
FIG. 5 illustrates various precursor nanofibers prepared according to processes described herein.

The fluid stock of Example 1 was electrospun by a gas-assisted technique. The overall process and apparatus is depicted in FIG. 5, Panel A. The fluid stock was loaded into a syringe pump connected to a spinneret with an inner nozzle diameter (fluid stock) of $4.13 \times 10^{-4}$ m and an outer (air) diameter of $1.194 \times 10^{-3}$ m. The distance between the nozzle and the collection plate was kept at about 15 cm and the fluid stock was spun at a rate of 0.1 ml/min. A charge of +15 kV was maintained at the collector. The air velocity at the nozzle was 100 m/s. The temperature of the air and fluid stock at the nozzle was 300 K.

Example 4

Copper Acetate and PVA Fluid Stock and Nanofiber

Following the procedure of Example 1, a fluid stock of copper acetate and PVA were prepared with ratios of precursor:polymer of 2:1. These fluid stocks were electrospun by the procedure of Example 3. FIG. 5, Panel B illustrates such electrospun nanofibers, having a diameter of approximately 600-800 nm as spun.

Example 5

Silver Acetate and PVA Fluid Stock and Nanofiber

Following the procedure of Example 1, a fluid stock of silver acetate and PVA were prepared with ratios of precursor:polymer of 2:1. These fluid stocks were electrospun by the procedure of Example 3. FIG. 5, Panel C illustrates such electrospun nanofibers, having a diameter of approximately 900-1200 nm as spun.

Example 6

Iron Acetate and PVA Fluid Stock and Nanofiber

Following the procedure of Example 1, a fluid stock of iron acetate and PVA were prepared with ratios of precursor:polymer of 2:1. These fluid stocks were electrospun by the procedure of Example 3. FIG. 5, Panel D illustrates such electrospun nanofibers, having a diameter of approximately 300-500 nm as spun.

Example 7

Zinc Acetate and PVA Fluid Stock and Nanofiber

Following the procedure of Example 1, a fluid stock of zinc acetate and PVA were prepared with ratios of precursor:polymer of 2:1. These fluid stocks were electrospun by the procedure of Example 3. FIG. 5, Panel E illustrates such electrospun nanofibers, having a diameter of approximately 500-1000 nm as spun.

Example 8

Cadmium Acetate and PVA Fluid Stock and Nanofiber

Following the procedure of Example 1, a fluid stock of cadmium acetate and PVA were prepared with ratios of precursor:polymer of 2:1. These fluid stocks were electrospun by the procedure of Example 3. FIG. 5, Panel F illustrates such electrospun nanofibers, having a diameter of approximately 800-1200 nm as spun.

Example 9

Zirconium Acetate and PVA Fluid Stock and Nanofiber

Following the procedure of Example 1, a fluid stock of zirconium acetate and PVA were prepared with ratios of precursor:polymer of 2:1. These fluid stocks were electrospun by the procedure of Example 3. FIG. 5, Panel G illustrates such electrospun nanofibers, having a diameter of approximately 800-1000 nm as spun.

Example 10

Lead Acetate and PVA Fluid Stock and Nanofiber

Following the procedure of Example 1, a fluid stock of lead acetate and PVA were prepared with ratios of precursor:polymer of 2:1. These fluid stocks were electrospun by the procedure of Example 3. FIG. 5, Panel H illustrates such electrospun nanofibers, having a diameter of approximately 500-1200 nm as spun.

Example 11

Lead Acetate, Selenium Powder and PVA Fluid Stock and Nanofiber

A mixture of 50/50 lead acetate and Se powder was prepared according to the procedures of Example 1. The precursors were further made into a fluid stock with PVA according to the procedure of Example 1 and electrospun according to the procedure of Example 3 to produce nanofiberrs, having a diameter of approximately 700-1300 nm as spun.

Example 12

Fluid Feeds and Nanofibers

Figure 7:
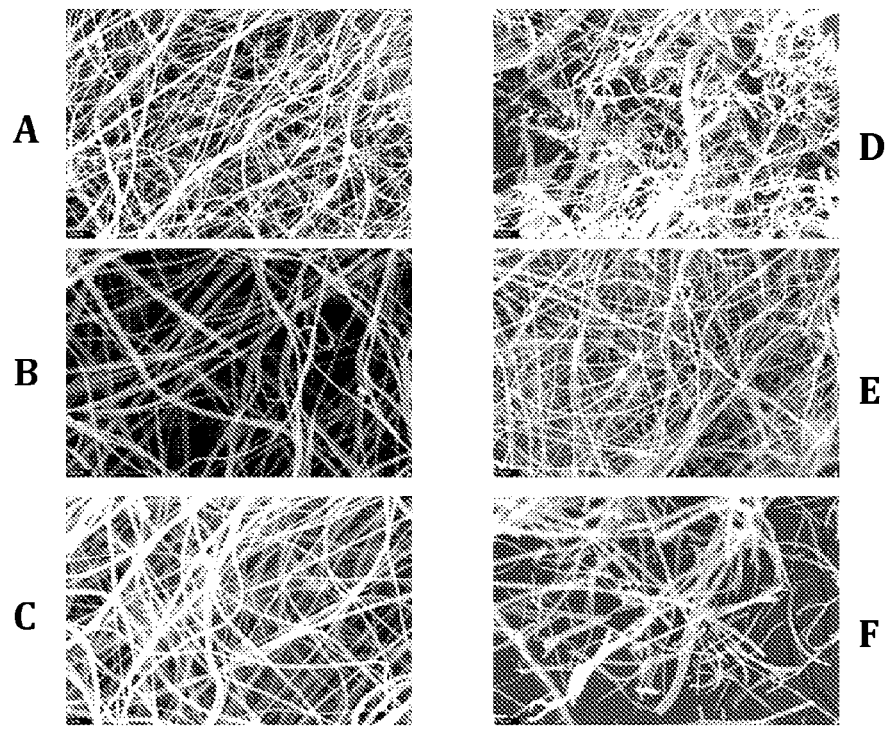
FIG. 7 illustrates various precursor nanofibers and metal carbide nanofiber nanostructures described herein and prepared according to processes described herein.

Following procedures similar to Example 1, fluid stocks were prepared by combining silicon acetate and PVA, iron acetate and PVA, and titanium dioxide nanoparticles and PVA. These fluid stocks were electrospun to produce nanofibers depicted in FIG. 7, Panels A, B, and C, respectively.

Additionally, following the procedure of Example 1, fluid stocks are prepared according to Table 3 in the identified precursor-to-polymer load ratio (based on initial precursor mass combined with the polymer). These fluid stocks are also electrospun according to the procedure of Example 3.

TABLE 3

| reagent | polymer | load ratio |
| --- | --- | --- |
| iron nitrate | PVA | 1:1 |
| iron chloride (+carbon powder) | PVA | 2:1 |
| iron acetate chromium acetate | PVE | 1:1 (89/11) |
| zirconium chloride | PVA | 2:1 |
| nickel bromide | PEO | 1:1 |
| chromium methoxide | PVE | 1.5:1 |
| tungsten ethoxide | PVA | 3:1 |

TABLE 3-continued

| reagent | polymer | load ratio |
| --- | --- | --- |
| CdClOH | polyvinyl pyridine | 1:1 |
| silver acetate | PEO | 1:1 |
| nickel nitrate | polyacrylic acid | 2:1 |
| copper ethoxide | PVA | 1:1 |
| nickel chloride | PVE | 3:1 |
| zirconium nitrate | polyvinyl pyridine | 1:1 |
| copper nitrate | PVE | 3.5:1 |
| nickel t-butoxide | PVO | 1:1 |
| copper chloride | polyacrylic acid | 1.5:1 |
| aluminum nitrate | PVE | 2:1 |
| zirconium acetate | | (70/30) |

Example 13

Metal Nanostructures

Figure 6:
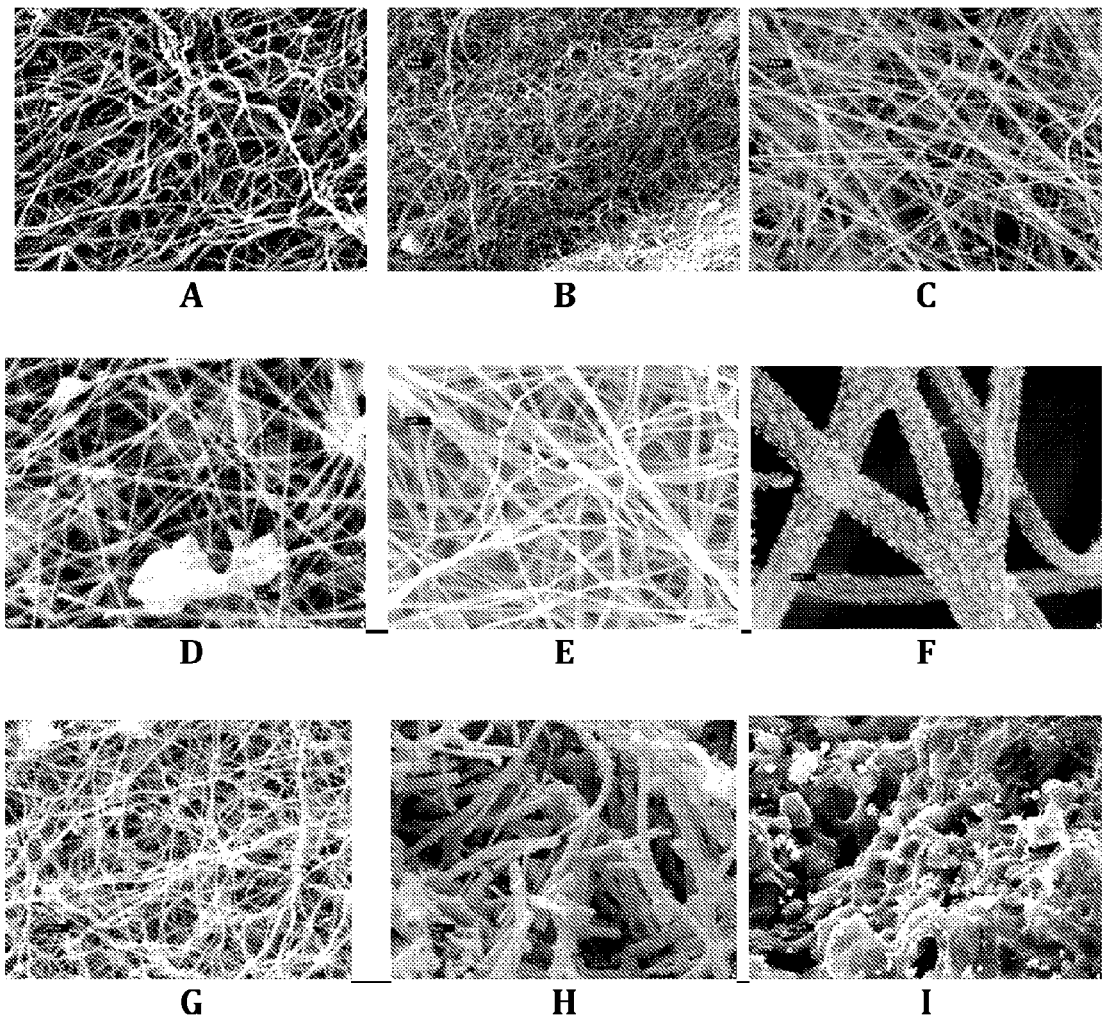
FIG. 6 illustrates exemplary metal nanostructures (nanofiber nanostructures) provided herein.

To produce metal nanofibers/nanostructures, the electrospun precursor nanofibers of Examples 3-12 are heated at a rate of 1-35° C. to a temperature of 600-800° C. and held there for 10 min to 20 hours under argon or a mixture of argon and hydrogen. For example, treatment of nanofibers produced by electrospinning fluid stocks prepared by combining (a) nickel acetate and PVA, (b) copper acetate and PVA, (c) silver acetate and PVA, (d) iron acetate and PVA, (e) lead acetate and PVA, (f) lead acetate, selenium powder and PVA, (g) cadmium acetate, selenium powder, and PVA, (h) cadmium acetate, tellurium powder, and PVA, and (i) lead acetate, tellurium powder, and PVA were utilized to produce nickel, copper, silver, iron, cadmium, lead, and lead-selenium alloy nanostructures. These metal nanostructures are illustrates in FIG. 6, Panels A, B, C, D, E, F, G, H, and I, respectively. Further optional processing of these metal nanostructures to a desired aspect ratio is achieved by sonication.

Example 14

Metal Oxide Nanostructures

Figure 10:
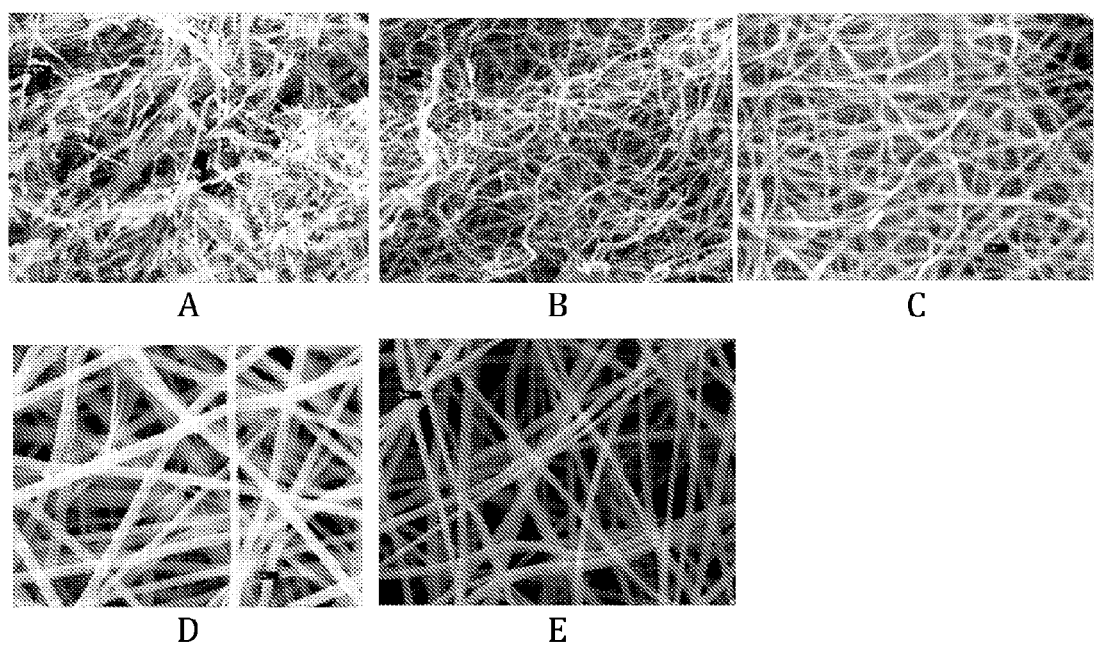
FIG. 10 illustrates exemplary metal oxide nanostructures (nanofiber nanostructures) provided herein.

To produce metal oxide nanofibers/nanostructures, the electrospun precursor nanofibers of Examples 3-12 are heated at a rate of 1-35° C. to a temperature of 600-800° C. and held there for 10 min to 20 hours under air. For example, treatment of nanofibers produced by electrospinning fluid stocks prepared by combining (a) nickel acetate and PVA, (b) copper acetate and PVA, (c) zinc acetate and PVA, (d) cadmium acetate and PVA, and (e) zirconium acetate and PVA were utilized to produce nickel oxide, copper oxide, zinc oxide, cadmium oxide, and zirconia nanostructures. These metal oxide nanostructures are illustrates in FIG. 10, Panels A, B, C, D, and E respectively. Further optional processing of these metal oxide nanostructures to a desired aspect ratio is achieved by sonication.

Example 15

Metal Carbide Nanofiber Nanostructures

Figure 8:
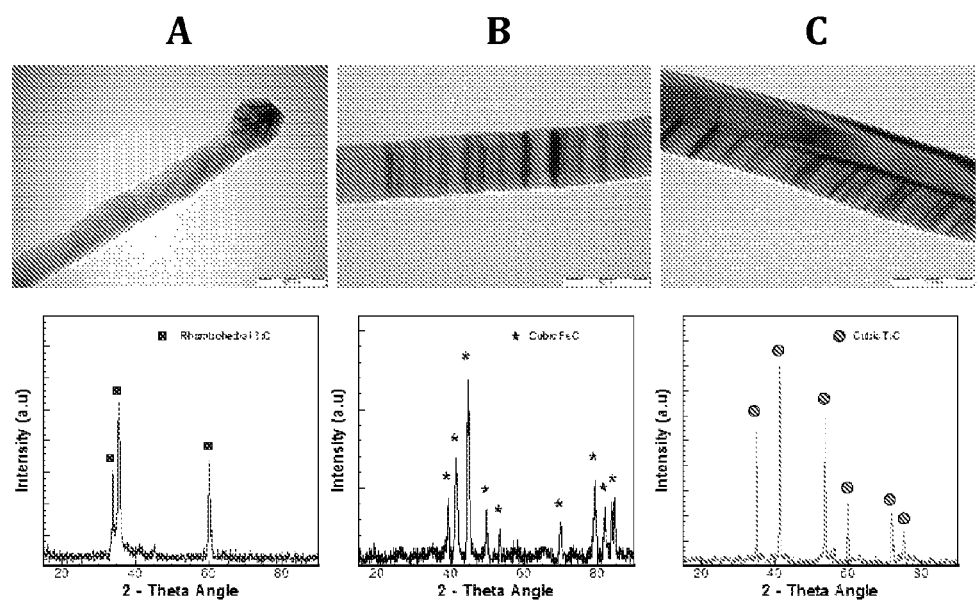
FIG. 8 illustrates metal carbide nanofiber nanostructures prepared according to the process described herein, as well as X-Ray Diffraction data therefor.

To produce metal carbide nanofibers, the electrospun precursor nanofibers of Examples 3-12 are heated at a rate of 1-35° C. to a temperature of 1000-1700° C. and held there for 10 min to 20 hours. For example, treatment of nanofibers produced by electrospinning fluid stocks prepared by combining silicon acetate and PVA, iron acetate and PVA, and titanium dioxide nanoparticles and PVA, were utilized to produce silicon carbide nanofibers, iron carbide nanofibers, and titanium carbide nanofibers. These metal carbide nanofibers are illustrates in FIG. 7, Panels D, E, and F, respectively. Single nanofibers and x-ray crystal diffraction patterns for such nanofibers are illustrated in FIG. 8, Panels A, B, and C, respectively.

Example 16

Nanocomposite Nanostructures

Figure 11:
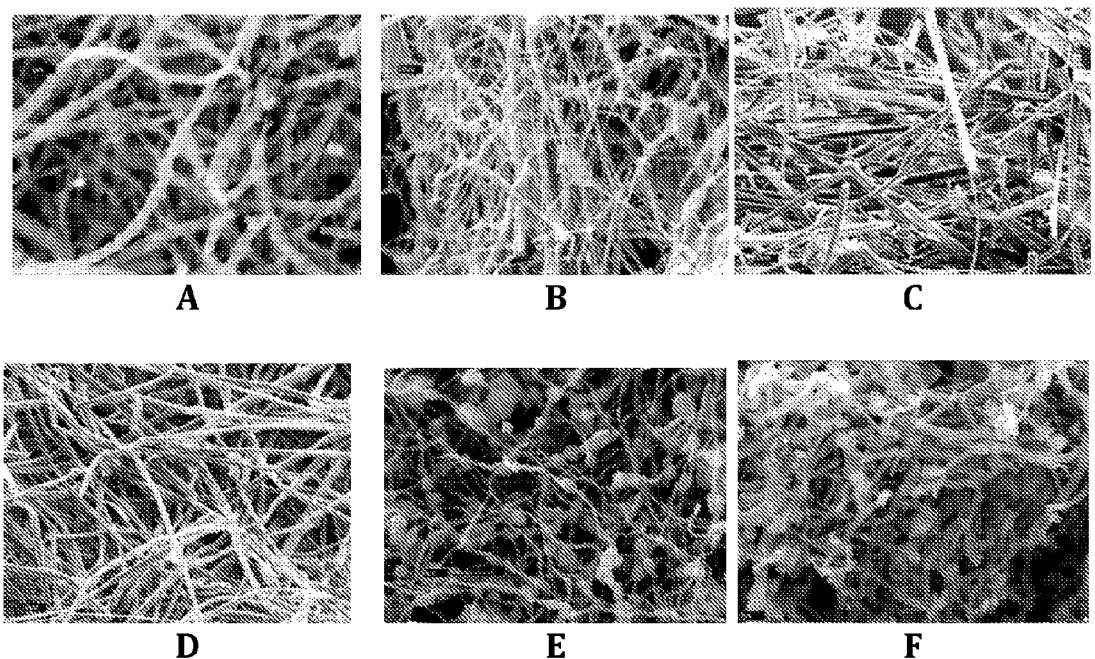
FIG. 11 illustrates exemplary nanocomopsite nanostructures (nanofiber nanostructures) provided herein

To produce coaxially layered composite nanofibers/nanostructures, a first fluid feed comprising a first metal precursor and first polymer is coaxially electrospun with a second fluid feed comprising a second metal precursor and a second polymer (which may be the same or different from the first). The electrospun precursor nanofibers are then heated at a rate of 1-35° C. to a temperature of 600-800° C. and held there for 10 min to 20 hours under air, argon, a mixture of argon and hydrogen, or a sequence thereof (e.g., first air and then a mixture of hydrogen and argon if a zirconia/metal nanocomposite is desired). For example, treatment of nanofibers produced by coaxially electrospinning fluid stocks of (a) zinc acetate/PVA and zirconium acetate/PVA, (b) silver acetate/PVA and zirconium acetate/PVA; (c) nickel acetate/PVA and zirconium acetate/PVA, (d) iron acetate/PVA and zirconium acetate/PVA, (e) nickel acetate/PVA and aluminum acetate/PVA, and (f) iron acetate/PVA and iron acetate/nickel acetate/PVA were utilized to produce coaxially layered nanostructures of zinc oxide/zirconia, silver/zirconia, nickel/zirconia, iron/zirconia, nickel/alumina, and iron oxide/iron-nickel alloy. These nanocomposite nanostructures are illustrates in FIG. 11, Panels A, B, C, D, E, and F respectively. Further optional processing of these nanocomposite nanostructures to a desired aspect ratio is achieved by sonication.

Example 17

Continuous Carbon Matrix, Discrete Metal Domain Nanofiber Nanostructures

To produce metal carbide nanofibers, the electrospun precursor nanofibers of Examples 3-12 are heated at a rate of 1-35° C. to a temperature of 400-1200° C. and held there for 10 min to 20 hours.

What is claimed is:
1. A process for producing a composite, the process comprising:
   a. gas assisted electrospinning a fluid stock into an electrospun material, the fluid stock comprising or prepared by combining (i) a polymer and (ii) a metal reagent component, forming an electrospun material, the polymer and metal reagent being combined in a metal reagent to polymer weight ratio of at least 1:1, and the metal reagent not undergoing a sol-gel process;
   b. thermally treating the electrospun material to provide nanofiber nanostructure reinforcing additive comprising a metal carbide nanofiber matrix;
   c. embedding the nanofiber nanostructure reinforcing additive in a bulk matrix material.
2. The reinforcing additive of claim 1, wherein the nanofiber nanostructures comprises, on average, at least 35 elemental wt. % of metal.
3. The composite material of claim 1, wherein the nanofiber nanostructures reinforcing additive comprises a plural- ity of nanostructures having a mean or median Young's modulus-to-diameter ratio of at least 0.2 GPa/nm.

4. The process of claim 1, further comprising fracturing the electrospun or thermally treated material, prior to embedding in a bulk matrix material.

5. The process of claim 4, wherein fracturing comprising sonicating, pressuring, grinding, chemical etching, laser irradiation, or any combination thereof.

6. The process of claim 1, wherein the fluid stock is coaxially electrospun with a stream of gas.

7. The process of claim 1, wherein the polymer is polyvinyl alcohol (PVA), polyvinyl acetate (PVAc), polyacrylonitrile (PAN), polyvinyl ether, polyvinyl pyrrolidone, polyglycolic acid, polyethylene oxide (PEO), hydroxyethylcellulose (HEC), cellulose, ethylcellulose, cellulose ethers, polyacrylic acid, polyisocyanate, or any combination thereof.

8. The process of claim 1, wherein the metal reagent component is a metal acetate, metal nitrate, metal chloride, metal alko-oxide, metal acetylacetonate, or any combination thereof.

9. The process of claim 1, wherein the mass ratio of metal reagent component to polymer in the fluid stock is between 1:1 and 4:1.

10. The process of claim 1, wherein the metal reagent component comprises nanoparticles of the metal reagent component.

11. The process of claim 1, wherein the matrix material is a polymer, metal, ceramic, or a carbide.

12. The process of claim 1, wherein the metal carbide is titanium carbide or silicon carbide.

13. The process of claim 6, wherein the gas has a velocity of 50 m/s to 1,000 m/s.

14. The process of claim 1, wherein the fluid stock is electrospun at a rate of $1 \times 10^{-11}$ m/s to $1 \times 10^{-9}$ m/s.

15. A composite prepared according to a process of claim 1.

16. The process of claim 12, wherein the metal carbide is titanium carbide.

17. The process of claim 12, wherein the metal carbide is silicon carbide.

* * * * *

UNITED STATES PATENT AND TRADEMARK OFFICE
CERTIFICATE OF CORRECTION

PATENT NO.           : 9,617,660 B2
APPLICATION NO.      : 14/428435
DATED                : April 11, 2017
INVENTOR(S)          : Joo et al.

Page 1 of 1

It is certified that error appears in the above-identified patent and that said Letters Patent is hereby corrected as shown below:

Column 38, Line 63 delete the words "reinforcing additive" and replace them with the word
--process--

Column 38, Line 66 delete the words "composite material" and replace them with the word
--process--

Signed and Sealed this
Tenth Day of July, 2018

Andrei Iancu
*Director of the United States Patent and Trademark Office*